United States Patent
Day

(10) Patent No.: US 11,230,266 B2
(45) Date of Patent: Jan. 25, 2022

(54) SENSOR AND GLAZING INCORPORATING A SENSOR

(71) Applicant: PILKINGTON GROUP LIMITED, Lathom (GB)

(72) Inventor: Stephen Roland Day, Wigan (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 16/645,834

(22) PCT Filed: Sep. 11, 2018

(86) PCT No.: PCT/GB2018/052580
§ 371 (c)(1),
(2) Date: Mar. 10, 2020

(87) PCT Pub. No.: WO2019/048893
PCT Pub. Date: Mar. 14, 2019

(65) Prior Publication Data
US 2020/0269815 A1   Aug. 27, 2020

(30) Foreign Application Priority Data
Sep. 11, 2017 (GB) .................................... 1714591

(51) Int. Cl.
*B60S 1/08*       (2006.01)
*B32B 17/10*      (2006.01)
*G01N 21/552*     (2014.01)

(52) U.S. Cl.
CPC ...... *B60S 1/0877* (2013.01); *B32B 17/10036* (2013.01); *B60S 1/0837* (2013.01); *G01N 21/552* (2013.01)

(58) Field of Classification Search
CPC .... B60S 1/0818; B60S 1/0822; B60S 1/0833; B60S 1/0837; B60S 1/084; B60S 1/0874;
(Continued)

(56) References Cited

U.S. PATENT DOCUMENTS 3,947,131 A * 3/1976 Karl .......................... B60J 1/20
                                                        356/445
4,589,771 A * 5/1986 Watanabe ............. B60S 1/0822
                                                      15/DIG. 15
(Continued)

FOREIGN PATENT DOCUMENTS

DE     10314704 A1 * 10/2004 ............... B60S 1/084
DE     10347977 A1 *  5/2005 ............ B60S 1/0822
(Continued)

OTHER PUBLICATIONS

U.K. Intellectual Property Office; GB Search Report, issued in GB Application No. 1714591.3; dated Feb. 13, 2018; 2 pages; U.K. Intellectual Property Office, Newport, South Wales, U.K.
(Continued)

*Primary Examiner* — Gordon J Stock, Jr.
(74) *Attorney, Agent, or Firm* — Marshall & Melhorn, LLC

(57) ABSTRACT

A laminated glazing and related detection method is described. The laminated glazing has a detecting device to determine the presence of mist on a surface of the glazing and/or the presence of an object contacting or proximal the glazing. The detecting device including transmitter means for emitting a beam of electromagnetic radiation, detector means for detecting electromagnetic radiation and a target for non-specular reflection of first beam of electromagnetic radiation. The transmitter means is configured to emit the beam of electromagnetic radiation to illuminate the target such that electromagnetic radiation reflects therefrom to illuminate a region of a major surface of the glazing. At least a portion of the electromagnetic radiation reflected off the region is detectable by the detector means to provide a detection signal for detecting mist on the region and/or the (Continued)

presence of an object contacting or proximal the glazing. A detection method is also described.

16 Claims, 13 Drawing Sheets

(58) Field of Classification Search
CPC ............ B60S 1/0877; B32B 17/10036; B32B 17/10761; B32B 17/10697; B32B 17/10788; B32B 17/10798; B32B 17/10706; B32B 17/10715; B32B 17/10724; B32B 17/10733; B32B 17/10743; B32B 17/10752; B32B 17/1077; B32B 17/10779; G01N 21/47; G01N 21/4738; G01N 21/552
USPC .......... 356/445–448; 340/602–604; 318/483, 318/643; 250/227.24, 227.25, 573, 221, 250/208.1
See application file for complete search history.

(56) References Cited

U.S. PATENT DOCUMENTS

| | | | |
|---|---|---|---|
| 4,737,629 A | | 4/1988 | Iwama et al. |
| 4,943,484 A * | | 7/1990 | Goodman ........... B32B 17/1033 428/441 |
| 4,973,511 A * | | 11/1990 | Farmer ................ B32B 27/36 428/216 |
| 5,024,895 A * | | 6/1991 | Kavanagh ............... B29C 51/10 428/437 |
| 5,811,793 A * | | 9/1998 | Pientka ................ B60S 1/0837 250/227.25 |
| 5,838,454 A * | | 11/1998 | Pientka ................ B60S 1/0822 356/445 |
| 6,084,519 A | | 7/2000 | Coulling et al. |
| 6,307,198 B1 | | 10/2001 | Asakura et al. |
| 6,668,104 B1 * | | 12/2003 | Mueller-Fiedler .... B60S 1/0822 385/12 |
| 6,681,163 B2 | | 1/2004 | Stam et al. |
| 6,768,099 B1 | | 7/2004 | Cheng et al. |
| 6,853,897 B2 | | 2/2005 | Stam et al. |
| 7,034,699 B2 | | 4/2006 | Sautter et al. |
| 7,102,501 B2 | | 9/2006 | Lo Presti et al. |
| 7,187,440 B2 * | | 3/2007 | Sautter ................ B60S 1/0822 356/239.8 |
| 7,492,459 B2 * | | 2/2009 | Takata ................ B60S 1/0822 250/227.11 |
| 7,948,617 B2 | | 5/2011 | Shubinsky et al. |
| 8,687,196 B2 * | | 4/2014 | Demma ............ B32B 17/10036 356/445 |
| 8,786,860 B2 * | | 7/2014 | Harrison ................ G01N 21/55 356/445 |
| 8,924,076 B2 | | 12/2014 | Boote et al. |
| 9,682,686 B2 * | | 6/2017 | Lee ...................... G01N 21/552 |
| 9,969,358 B2 * | | 5/2018 | Park ...................... G01N 21/552 |
| 10,351,105 B2 | | 7/2019 | Ashrafi et al. |
| 2002/0040964 A1 * | | 4/2002 | Dausmann ............. B60S 1/084 250/227.25 |
| 2005/0174561 A1 | | 8/2005 | Murakami et al. |
| 2008/0212101 A1 * | | 9/2008 | Wolf ................... G01N 21/552 356/445 |

FOREIGN PATENT DOCUMENTS

| | | | | |
|---|---|---|---|---|
| DE | 102005027087 A1 | | 12/2006 | |
| EP | 0736426 A1 | | 10/1996 | |
| EP | 0941900 A2 | | 9/1999 | |
| EP | 0999104 A2 | | 5/2000 | |
| EP | 1553398 A1 | | 7/2005 | |
| FR | 2781575 A1 * | | 1/2000 | ............ B60S 1/0833 |
| GB | 2360583 A | | 9/2001 | |
| JP | 2014211358 A | | 11/2014 | |
| WO | 03/029757 A2 | | 4/2003 | |
| WO | 2004/002789 A1 | | 1/2004 | |
| WO | 2008/113978 A1 | | 9/2008 | |
| WO | 2009/083291 A1 | | 7/2009 | |

OTHER PUBLICATIONS

European Patent Office; International Search Report with Written Opinion; issued in PCT/GB2018/052580; dated Nov. 26, 2018; 10 pages; European Patent Office, Rijswijk, Netherlands.

* cited by examiner

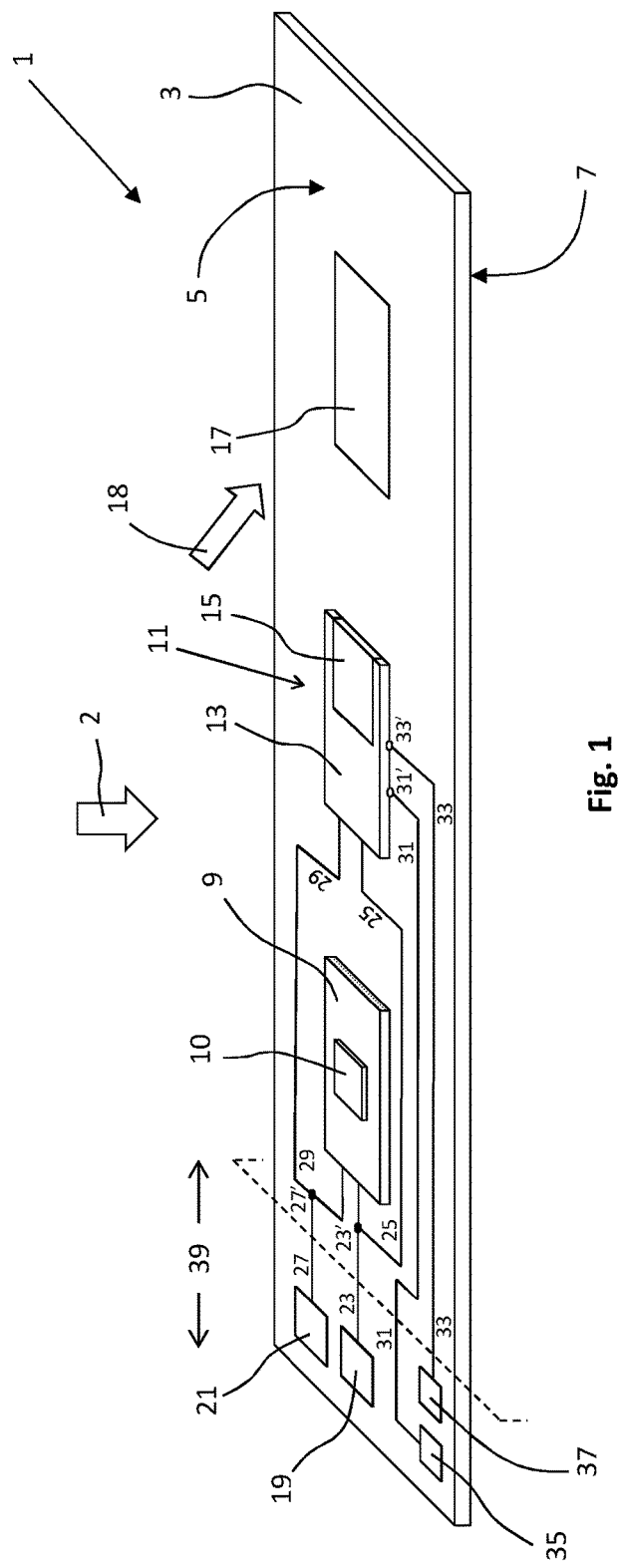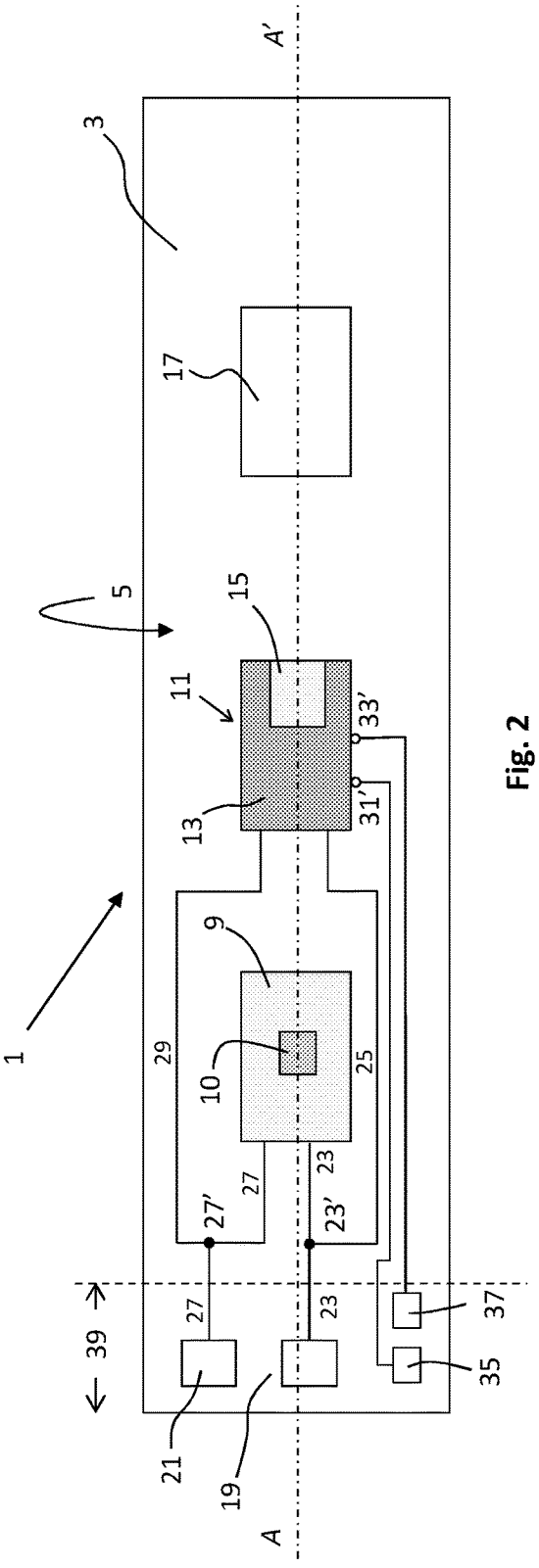
Fig. 1
Fig. 2

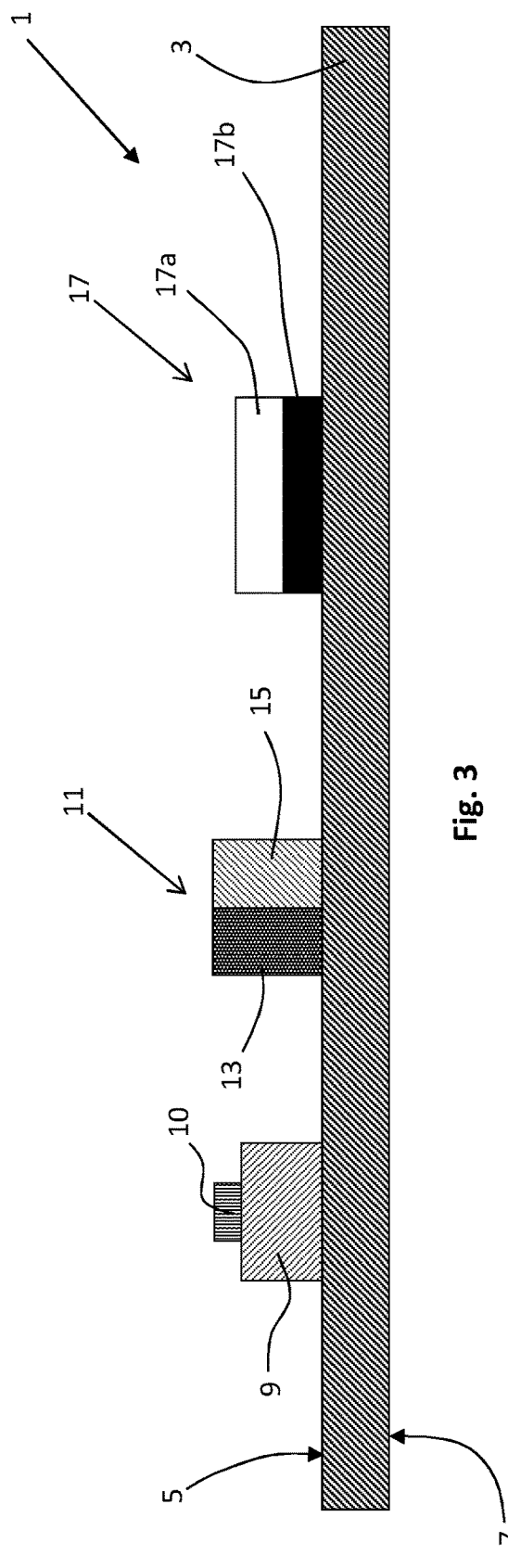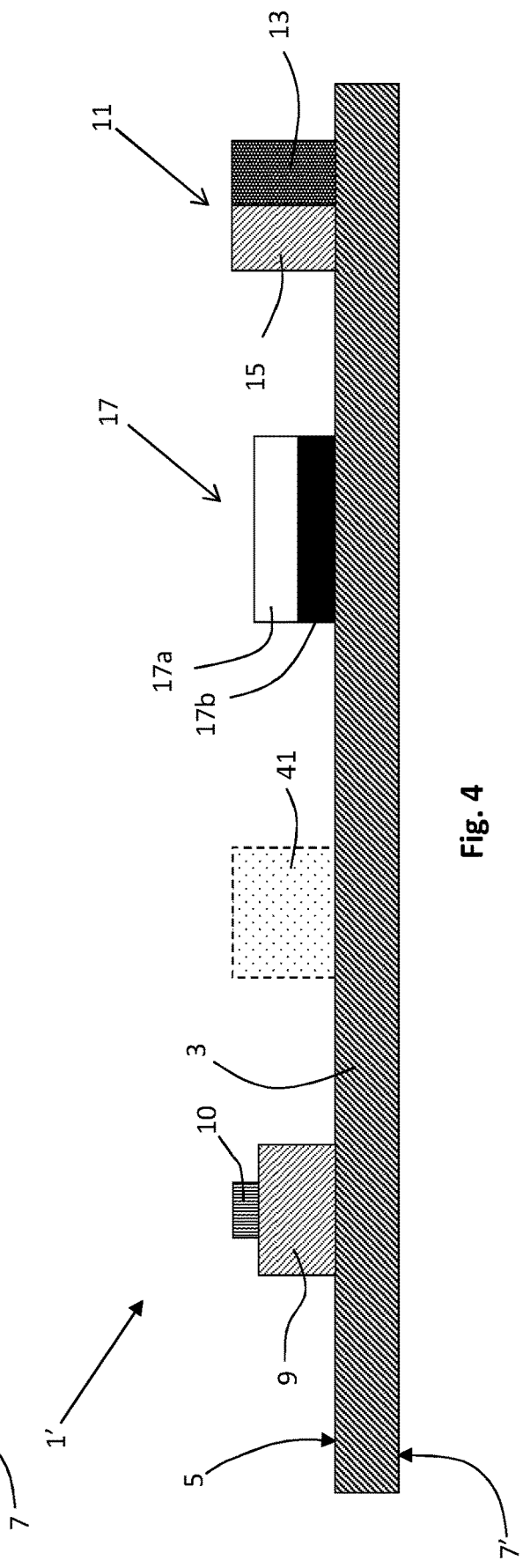

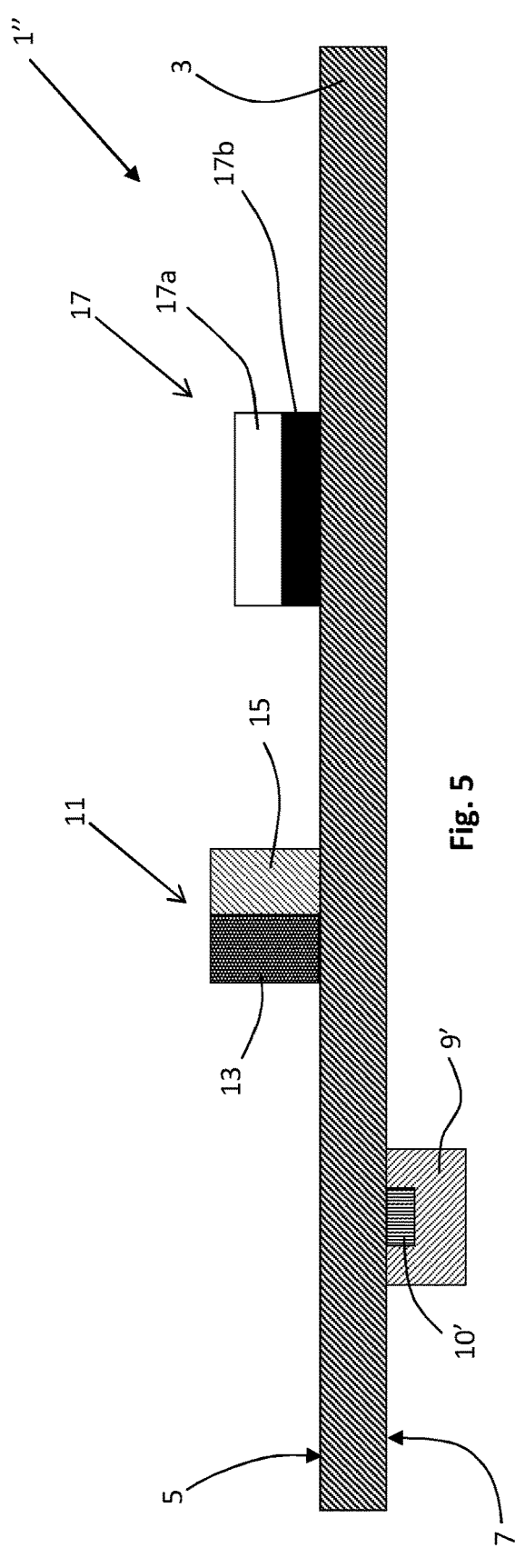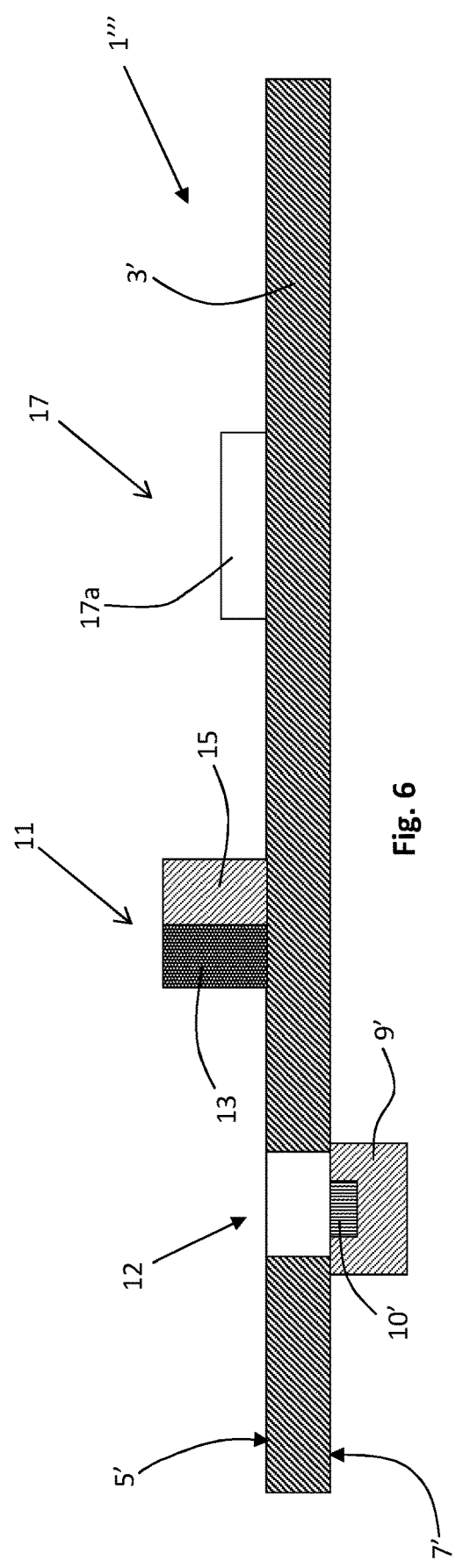

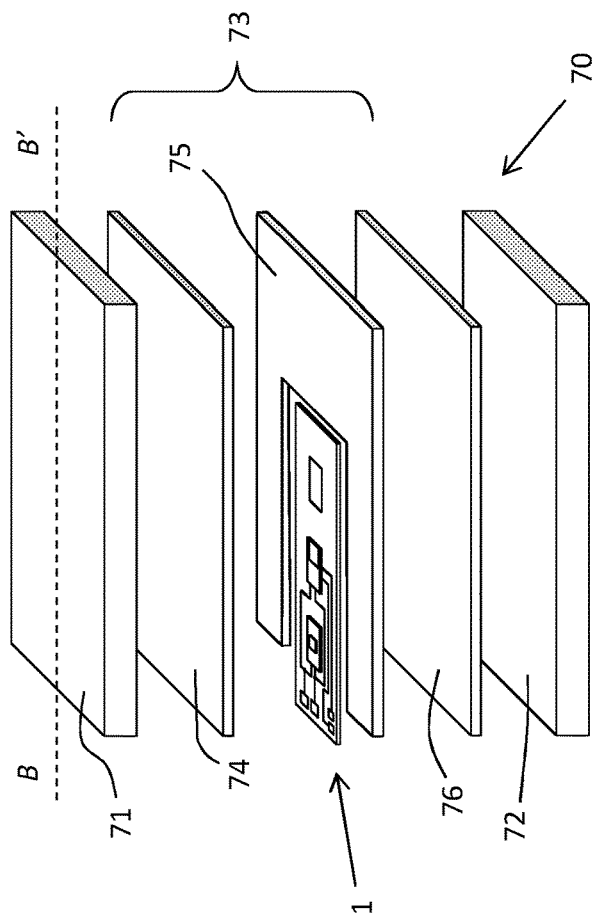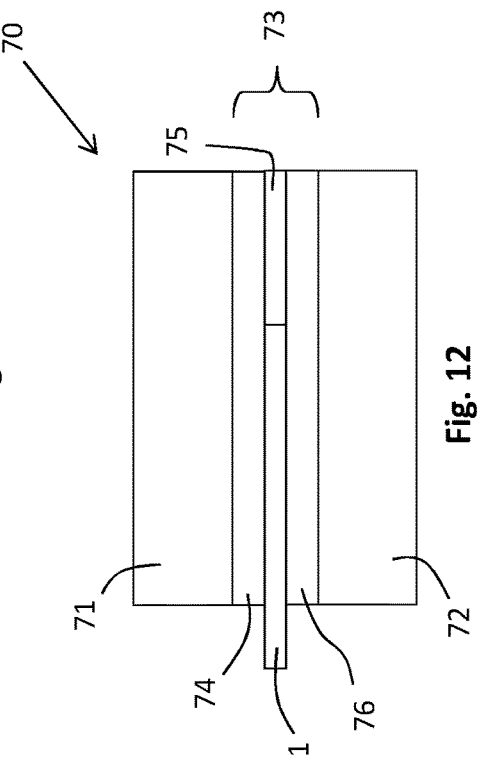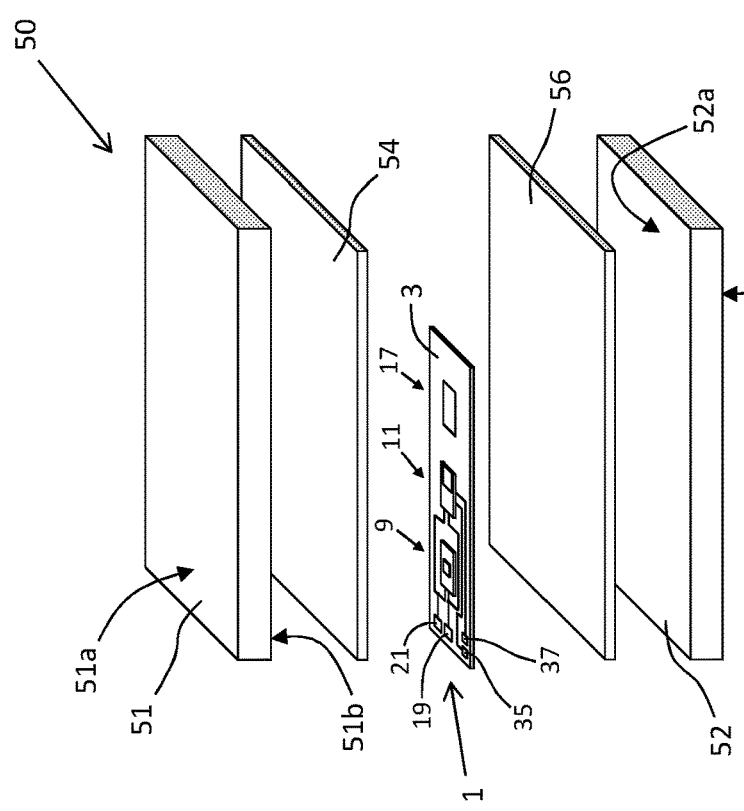

SENSOR AND GLAZING INCORPORATING A SENSOR

BACKGROUND OF THE INVENTION

The present invention relates to a laminated glazing comprising a device for detecting mist on a surface of the laminated glazing, to a method of detecting mist on a surface of a window and to a device for detecting mist on a surface of a window. The device may also be used to determine the presence of an object contacting or proximal the glazing.

It is well known that under certain conditions, part of or all a surface of a window may become covered with tiny drops of moisture making it difficult to see through the glass. This fine layer of condensation is usually referred to as "mist" or "misting" on the surface, for example "mist on a glass surface". A common example of such a misted surface can be observed when a person breathes out through their mouth onto a window or mirror.

In the field of automotive glazings it is known that a windscreen installed in a vehicle can become misted on the inside surface of the windscreen thereby obstructing the drivers view through the windscreen. Moisture in the atmosphere in the passenger compartment of the vehicle can condense on the vehicle windscreen when the temperature of the windscreen drops below the dew point. Typically, the vehicle is equipped with an electrically operable fan that once actuated can direct warm air towards the vehicle windscreen to remove the moisture on the inside surface of the windscreen, thereby demisting the vehicle windscreen i.e. removing mist from the vehicle windscreen.

For certain types of vehicle, such as an electric car, it is desirable to reduce the electrical power provided to systems of the vehicle other than the motor drive system, thereby providing the vehicle with an increased drivable range. As such, it is desirable to reduce the amount of time an electric fan is used to remove mist from a vehicle windscreen.

As well as directing warm air onto the vehicle windscreen, other systems for demisting the vehicle windscreen are known and include (i) an electrically conductive transparent coating provided on a surface of the windscreen and (ii) an array of heater wires provided between the inner and outer glass panes of the windscreen. These alternatives (i) and (ii) still require the use of electrical power to provide the demist function.

It is therefore advantageous to monitor the vehicle windscreen so that as the vehicle windscreen begins to mist over, the demisting means, for example the electrically operable fan, may be actuated for a short time thereby reducing the electrical power drawn from the vehicle power supply.

U.S. Pat. No. 4,737,629 describes a control system for discriminating the occurrence of fogging of the windscreen of a vehicle due to the deposition of water drops or the like from the degree of optical scattering and automatically starting and stopping the operation of a defogging apparatus according to the result of the discrimination.

U.S. Pat. No. 6,084,519 describes an apparatus and method for controlling the operation of the air conditioning system in response to the formation of water condensation on the interior of the windshield of the vehicle.

U.S. Pat. No. 6,768,099B1 relates to the field of detection of parameters representative of a state associated with a motor vehicle, in particular the glazing of the vehicle, such as a windscreen or a rear window. Such a state associated with the glazing relates to the presence of misting or of drops of water on one face of the glazing or dirtying, which are capable of being detected by electromagnetic means.

In U.S. Pat. No. 7,102,501B2 a device and method are described for automatically preventing misting of the windscreen of a vehicle, wherein a number of sensors determine ambient conditions capable of misting the windscreen, and upon such ambient conditions occurring, an electronic central control unit automatically activate the air-conditioning system of the vehicle to prevent the windscreen from misting. A radiant mean temperature sensor is arranged inside the vehicle passenger compartment to measure temperature inside the passenger compartment. The radiant mean temperature sensor has field of view including at least a part of the windscreen.

It is also known to incorporate sensors into glazings to provide the glazing with additional functionality. For example, it is known to incorporate a sensor into a glazing to function as a switch to control the operation of an external device by manual operation of the sensor. For example WO2008/113978A1 describes a laminated vehicle glazing comprising: at least two glazing panes laminated together by at least one interlayer therebetween; at least one sensor which is manually operable by the presence of a user's hand contacting or proximal to at least one of the panes; at least one shield associated with the at least one sensor whereby the at least one sensor is manually operable by the presence of a user's hand from only one side of the vehicle glazing; and at least one connector electrically connected to the at least one sensor connectable to an external device for control of the external device by manual operation of the at least one sensor.

It is also desirable for a sensor to have a more than one function. This allows the same sensor to perform more than one operation depending upon how the sensor is configured. Furthermore, if the same sensor design can be used to perform more than one operation, manufacturing costs may be reduced.

The present invention provides a device that may be used as an alternative mist sensor or as an alternative contact/proximity sensor.

Accordingly from a first aspect the present invention provides a laminated glazing comprising a first pane of glazing material joined to a second pane of glazing material by an interlayer structure comprising at least one ply of adhesive interlayer material, each of the first and second panes of glazing material having respectively a first major surface and a second opposing major surface, the laminated glazing being configured such that the second major surface of the first pane of glazing material faces the first major surface of the second pane of glazing material, wherein the laminated glazing comprises at least one device, the at least one device comprising transmitter means for emitting at least one (a first) beam of electromagnetic radiation, detector means for detecting electromagnetic radiation and a target having a reflective surface for the first beam of electromagnetic radiation, the reflective surface of the target being a non-specular reflective surface, wherein the transmitter means is configured to emit the first beam of electromagnetic radiation to illuminate the target such that electromagnetic radiation reflected from the reflective surface of the illuminated target follows at least one path towards the first major surface of the first pane of glazing material to illuminate a region thereof and at least a portion of the electromagnetic radiation reflected off the region of the first major surface of the first pane of glazing material is detectable by the detector means to provide a detection signal.

The at least one device may also be referred to as a detecting device or a sensor. The detecting device may be used to detect a perturbation on or near the region of the first major surface of the first pane of glazing material, the perturbation being caused by mist and/or by the presence of an object near to or in contact with the region of the first major surface of the first pane of glazing material. The detecting device may be used to detect a perturbation on or near first major surface of the first pane of glazing material, the perturbation being caused by the presence of an object near to or in contact with at least a portion of the first major surface of the first pane of glazing material.

Preferably the at least one device is a device for detecting mist on the first major surface of the first pane of glazing material and the detection signal is for detecting mist on the region of the first pane of glazing material.

Preferably the at least one device is a device for detecting an object contacting or proximal at least a portion of the first major surface of the first pane of glazing material and the detection signal is for detecting the object contacting or proximal the region of the first major surface of the first pane of glazing material. Preferably the object is a user's hand or finger.

By using an illuminated target have a non-specular reflective surface to provide a sensing beam, which may be for sensing or detecting mist, a larger region of the first major surface of the first pane of glazing material may be illuminated thereby increasing sensitivity. The device is able to detect the presence of mist on the first major surface of the first pane of glazing material and may also be used for detecting an object contacting or proximal at least a portion of the first major surface of the first pane of glazing material.

The transmitter means emits at least one beam of electromagnetic radiation in a wavelength range, such as $\lambda \pm \Delta\lambda$, for example where $\lambda$ may be 880 nm and $\Delta\lambda$ may be 60 nm and the intensity variation of the electromagnetic radiation from the transmitter means with wavelength may be Gaussian. The detector means is operable to detect electromagnetic radiation having at least one wavelength in the wavelength range of the electromagnetic radiation emitted by the transmitter mean. At one or more wavelength in the wavelength range of the electromagnetic radiation emitted by the transmitter means, the reflective surface of the target is reflective but is not a specular reflector.

Preferably the transmitter means is a point source. When the transmitter means is a point source, the transmitter means emits a plurality of beams of electromagnetic radiation, each in the wavelength range emitted by the particular transmitter means.

Preferably the reflective surface of the target comprises a retroreflector. A retroreflector is a surface that reflects light back to its source with a minimum of scattering. In a retroreflector an electromagnetic wave front is reflected back along a vector that is parallel to but opposite in direction from the source of the wave.

Preferably the reflective surface of the target comprises a reflecting surface that provides diffuse reflection of an incident beam of electromagnetic radiation. Such a reflecting surface is able to scatter the incident beam of electromagnetic radiation at many angles in contrast to a reflecting surface that is a specular reflector, wherein an incident beam is reflected at just one angle.

When the target comprises a reflecting surface that provides diffuse reflection of an incident beam of electromagnetic radiation, preferably the target comprises a layer of paint, more preferably a layer of white paint.

In some embodiments the transmitter means is on the first major surface of the first pane of glazing material and the detector means and/or the target are between the first and second panes of glazing material.

In some embodiments the transmitter means is on the first major surface of the first pane of glazing material and the detector means and the target are on the second major surface of the second pane of glazing material.

In some embodiments the transmitter means, the detector means and the target are between the first and second panes of glazing material. That is, in these embodiments the transmitter means, the detector means and the target are between the first major surface of the first pane of glazing material and the second major surface of the second pane of glazing material.

Embodiments where the transmitter means, the detector means and the target are between the first and second panes of glazing material have preferable features.

Preferably the first beam of electromagnetic radiation emitted from the transmitter means is reflected off the first major surface of the first pane of glazing material to illuminate the target. That is, preferably the transmitter means is configured to emit the first beam of electromagnetic radiation for reflection off the first major surface of the first pane of glazing material to illuminate the target.

Preferably there is at least one electrically conductive pathway on the second major surface of the first pane of glazing material and at least one of the transmitter means and the detector means is in electrical communication with the at least one electrically conductive pathway on the second major surface of the first pane of glazing material. Preferably the at least one electrically conductive pathway on the second major surface of the first pane of glazing material is in direct contact with the second major surface of the first pane of glazing material.

Preferably there are at least two electrically conductive pathways on the second major surface of the first pane of glazing material being connectable to a power supply and at least one of the transmitter means and the detector means is in electrical communication with each of the at least two electrically conductive pathways on the second major surface of the first pane of glazing material. Preferably the at least two electrically conductive pathways on the second major surface of the first pane of glazing material are in direct contact with the second major surface of the first pane of glazing material.

Preferably there is at least one electrically conductive pathway on the first major surface of the second pane of glazing material and at least one of the transmitter means and the detector means is in electrical communication with the at least one electrically conductive pathway on the first major surface of the second pane of glazing material. Preferably the at least one electrically conductive pathway on the first major surface of the second pane of glazing material is in direct contact with the first major surface of the second pane of glazing material.

Preferably there are at least two electrically conductive pathways on the first major surface of the second pane of glazing material being connectable to a power supply and at least one of the transmitter means and the detector means is in electrical communication with the each of the at least two electrically conductive pathways on the first major surface of the second pane of glazing material. Preferably the at least two electrically conductive pathways on the first major surface of the second pane of glazing material are in direct contact with the first major surface of the second pane of glazing material.

Preferably there is at least one electrically conductive pathway on the second major surface of the first pane of glazing material and at least one electrically conductive pathway on the first major surface of the second pane of glazing material, further wherein one of the transmitter means and the detector means in in electrical communication with the at least one electrically conductive pathway on the first major surface of the second pane of glazing material, the other of the transmitter means and the detector means being in electrical communication with the at least one electrically conductive pathway on the second major surface of the first pane of glazing material.

Preferably the target is on the second major surface of the first pane of glazing material, the first major surface of the second pane of glazing material or the at least one ply of adhesive interlayer material.

Preferably the transmitter means is arranged to emit the first beam of electromagnetic radiation at an angle of incidence to a normal on the first major surface of the first pane of glazing material, wherein the angle of incidence is at least $\sin^{-1}(n_2/n_1)$ where $n_1$ is the refractive index of the first pane of glazing material at a wavelength $\lambda_i$ and $n_2$ is the refractive index of air or water at the wavelength $\lambda_i$. Preferably $\lambda_i$ is at wavelength within the range of wavelengths of the first beam of electromagnetic radiation, but it may not be. Preferably $\lambda_i$ is 540 nm or 780 nm or 880 nm.

Preferably the transmitter means is arranged to emit the first beam of electromagnetic radiation at an angle of incidence to a normal on the first major surface of the first pane of glazing material of greater than 40°, preferably greater than 50°, preferably greater than 60°.

Preferably the transmitter means is arranged to emit the first beam of electromagnetic radiation at an angle of incidence to a normal on the first major surface of the first pane of glazing material of between 40° and 80°, more preferably between 55° and 65°.

Preferably the transmitter means is spaced apart from the first major surface of the first pane of glazing material by a minimum distance h, and the spacing of the transmitter means and an edge of the target is at least $2 \times h \times \tan(\theta)$ where $\theta$ is the angle of incidence of the first beam of electromagnetic radiation to a normal on the first major surface of the first pane of glazing material.

In some embodiments where the transmitter means, the detector means and the target are between the first and second panes of glazing material, at least one of the transmitter means and the detector means is on a first substrate, the first substrate having a first major surface and a second opposing major surface, further wherein the first major surface of the first substrate faces the second major surface of the first pane of glazing material and the second major surface of the first substrate faces the first major surface of the second pane of glazing material.

Preferably at least one of the transmitter means and the detector means is on the first major surface of the first substrate.

Preferably at least one of the transmitter means and the detector means is on the second major surface of the first substrate.

Preferably one of the transmitter means and the detector means is on the first or second major surface of the first substrate, the other of the transmitter means and the detector means being on the opposite major surface of the first substrate.

Preferably the transmitter means is on the second major surface of the first substrate.

Preferably the first substrate has an opening therein, the opening being coincident with the transmitter means such that the first beam of electromagnetic radiation can pass through the opening.

Preferably the transmitter means is on the first major surface of the first substrate and the detector means is on the second major surface of the first substrate.

Preferably the target is on the second major surface of the first pane of glazing material, the first major surface of the second pane of glazing material or the at least one ply of adhesive interlayer material.

In some embodiments where the transmitter means, the detector means and the target are between the first and second panes of glazing material and at least one of the transmitter means and the detector means is on a first substrate, the first substrate having a first major surface and a second opposing major surface, further wherein the first major surface of the first substrate faces the second major surface of the first pane of glazing material and the second major surface of the first substrate faces the first major surface of the second pane of glazing material, preferably the transmitter means, the detector means and the target are on the first substrate.

Preferably at least one of the transmitter means, the detector means and the target are on the first major surface of the first substrate.

Preferably at least one of the transmitter means, the detector means and the target are on the second major surface of the first substrate.

Preferably the transmitter means, the detector means and the target are on the first major surface of the first substrate.

Preferably the transmitter means, the detector means and the target are on the second major surface of the first substrate.

In some embodiments where the transmitter means, the detector means and the target are between the first and second panes of glazing material and at least one of the transmitter means and the detector means is on a first substrate, the first substrate having a first major surface and a second opposing major surface, further wherein the first major surface of the first substrate faces the second major surface of the first pane of glazing material and the second major surface of the first substrate faces the first major surface of the second pane of glazing material, preferably the first and/or second major surface of the first substrate has one or more electrically conductive pathways thereon and at least one of the electrically conductive pathways on the first or second major surface of the first substrate is in electrical communication with one of the transmitter means or the detector means.

Preferably the or each electrically conductive pathway comprises an electrically conductive ink. Preferably the electrically conductive ink has been printed.

Preferably the or each electrically conductive pathway comprises a metal containing layer, in particular a silver or a copper containing layer.

Preferably the or each electrically conductive pathway comprises an electrically conductive coating layer. The coating layer may be sectionalised by having an electrically insulating region between two coating layers each forming a separate electrically conductive pathway.

Suitable electrically conductive coatings are known in the art and include indium tin oxide (ITO) and fluorine doped tin oxide.

In some embodiments where the transmitter means, the detector means and the target are between the first and second panes of glazing material and at least one of the transmitter means and the detector means is on a first substrate, preferably the first substrate is transparent to the first beam of electromagnetic radiation.

Preferably the first substrate comprises polyethylene terephthalate (PET).

In embodiments having one or more electrically conductive pathway on one or more of the second major surface of the first pane of glazing material, the first major surface of the second pane of glazing material and the first or second major surface of a substrate, preferably the or each electrically conductive pathway comprises an electrically conductive ink.

Preferably the electrically conductive ink has been printed.

Preferably the or each electrically conductive pathway comprises a metal containing layer, in particular a silver or a copper containing layer.

Preferably the or each electrically conductive pathway comprises an electrically conductive coating layer. The coating layer may be sectionalised by having an electrically insulating region between two coating layers each forming a separate electrically conductive pathway.

Suitable electrically conductive coatings are known in the art and include indium tin oxide (ITO) and fluorine doped tin oxide.

Other embodiments of the first aspect of the present invention have other preferable features.

Preferably the detector means is between the transmitter means and the target.

Preferably when the laminated glazing is viewed in the direction of a normal to the first major surface of the first pane of glazing material, the detector means is between the transmitter means and the target.

Preferably the laminated glazing further comprises an element for reducing the amount of electromagnetic radiation that reaches the detector means from electromagnetic radiation other than electromagnetic radiation from the illuminated target. Preferably the element is a body portion of the detector means. Preferably the element comprises an opaque layer on the first major surface of the first pane of glazing material, the second major surface of the second pane of glazing material or between the first and second panes of glazing material.

Preferably the target comprises a first layer for reflecting electromagnetic incident thereon and a second layer for preventing electromagnetic radiation reaching the first layer from the direction of the second major surface of the second pane of glazing material.

Preferably the at least one ply of adhesive interlayer material comprises polyvinyl butyral (PVB).

Preferably the at least one ply of adhesive interlayer material comprises acoustic modified PVB.

Preferably the at least one ply of adhesive interlayer material comprises a copolymer of ethylene, such as ethylene vinyl acetate (EVA).

Preferably the at least one ply of adhesive interlayer material comprises polyurethane, in particular a thermoplastic polyurethane (TPU).

Preferably the transmitter means comprises a solid state source, in particular a light emitting diode (LED).

Preferably the transmitter means is operable at one or more wavelengths between 380 nm and 1200 nm.

Preferably the detector means is operable at one or more wavelengths between 380 nm and 1200 nm.

Preferably the target is reflective at one or more wavelengths between 380 nm and 1200 nm.

Preferably the laminated glazing further comprises a first pair of electrical contact means for providing electrical power to the transmitter means and a second pair of electrical contacts for measuring the signal from the detector means.

Preferably the first and/or second pane of glazing material comprises glass, in particular soda-lime-silica glass. The glass may be annealed, thermally toughened, semi-toughened or chemically strengthened.

A typical soda-lime-silica glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2%; $Fe_2O_3$ 0.005-2%. The glass composition may also contain other additives, for example, refining aids, which would normally be present in an amount of up to 2%.

Preferably the laminated glazing is curved in at least one direction. Preferably the radius of curvature in the at least one direction is between 500 mm and 20000 mm, more preferably between 1000 mm and 8000 mm.

From a second aspect the present invention provides a detection method comprising the steps: (i) directing a beam of electromagnetic radiation from a transmitter means onto a target having a surface that is not a specular reflector to illuminate the target; (ii) illuminating a region of the surface of the window with electromagnetic radiation from the illuminated target; (iii) capturing electromagnetic radiation reflected off the region of the surface of the window with detector means to provide a detection signal; (iv) using the detection signal to determine the presence of mist on the surface of the window and/or the presence of an object, preferably a user's hand or finger, contacting or proximal at least a portion of the surface of the window.

Preferably the detection method is a method of detecting mist on a surface of a window and in step (iv) the detection signal is not used to determine the presence of an object contacting or proximal at least a portion of the first major surface of the first pane of glazing material.

DETAILED DESCRIPTION OF THE INVENTION

The window has at least one pane of glazing material having a first major surface and a second opposing major surface and preferably during step (ii) a region of the first major surface of the at least one pane of glazing material is illuminated with electromagnetic radiation reflected from the reflective surface of the illuminated target such that during step (iv), the detection signal is used to determine the presence of mist on the region of the first major surface of the at least one sheet of glazing material and/or the presence of an object, preferably a user's hand or finger, contacting or proximal at least a portion of the first major surface of the at least one pane of glazing material, preferably the region of the first major surface of the at least one pane of glazing material.

Preferably the target comprises a retroreflector. A retroreflector is a surface that reflects light back to its source with a minimum of scattering. In a retroreflector an electromagnetic wave front is reflected back along a vector that is parallel to but opposite in direction from the source of the wave.

Preferably the target comprises a reflecting surface that provides diffuse reflection of an incident beam of electromagnetic radiation. Such a reflecting surface is able to scatter the incident beam of electromagnetic radiation at many angles in contrast to a reflecting surface that is a specular reflector, wherein an incident beam is reflected at just one angle.

When the target comprises a reflecting surface that provides diffuse reflection of an incident beam of electromagnetic radiation, preferably the target comprises a layer of paint, more preferably a layer of white paint.

When the target comprises a reflecting surface that provides diffuse reflection of an incident beam of electromagnetic radiation, during step (ii) the region of the surface of the window is illuminated with scattered light from the target.

Preferably in step (i) the beam of electromagnetic radiation is directed towards the surface of the window and reflects off the surface of the window to illuminate the target.

Preferably the window comprises a first pane of glazing material spaced apart from a second pane of glazing material, wherein the transmitter means, the detector means and the target are between the first and second panes of glazing material.

Preferably the beam of electromagnetic radiation is directed towards the surface of the window at an angle of incidence to a normal on the surface of the window, wherein the angle of incidence is greater than $\sin^{-1}(n_2/n_1)$ where $n_1$ is the refractive index of the first pane of glazing material at a wavelength $\lambda_i$ and $n_2$ is the refractive index of air or water at the wavelength $\lambda_i$. Preferably $\lambda_i$ is at wavelength within the range of wavelengths of the beam of electromagnetic radiation, but may not be. Preferably $\lambda_i$ is 540 nm or 780 nm or 880 nm.

Preferably the beam of electromagnetic radiation is directed towards the surface of the window at an angle of incidence to a normal on the surface of the window, wherein the angle of incidence is greater than 40°, preferably greater than 50°, more preferably between 40° and 80°, even more preferably between 55° and 65°.

Preferably the window is a laminated glazing, in particular a vehicle windscreen, installed in a vehicle, the laminated glazing having an inner surface facing the interior of the vehicle and an opposing outer surface, further wherein the surface of the window is the inner surface of the laminated glazing.

From a third aspect the present invention provides a device for detecting mist on a surface or for detecting the presence of an object, preferably a user's hand or finger, contacting or proximal at least a portion of a surface, the device comprising transmitter means for emitting at least one (a first) beam of electromagnetic radiation, detector means for detecting electromagnetic radiation and a target having a reflective surface for non-specular reflection of the first beam of electromagnetic radiation, wherein the transmitter means is configured to emit the first beam of electromagnetic radiation to illuminate the target such that electromagnetic radiation reflected from the illuminated target follows at least one path towards the surface to illuminate a region thereof, at least a portion of the electromagnetic radiation reflected off the region of the surface being detectable by the detector means to provide a signal for detecting mist on the region of the surface and/or a signal for detecting the presence of an object, preferably a user's hand or finger, contacting or proximal at least a portion of the surface, preferably the region of the surface.

Preferably the reflective surface of the target comprises a retroreflector. A retroreflector is a surface that reflects light back to its source with a minimum of scattering. In a retroreflector an electromagnetic wave front is reflected back along a vector that is parallel to but opposite in direction from the source of the wave.

Preferably the reflective surface of the target comprises a reflecting surface that provides diffuse reflection of an incident beam of electromagnetic radiation. Such a reflecting surface is able to scatter the incident beam of electromagnetic radiation at many angles in contrast to a reflecting surface that is a specular reflector, wherein an incident beam is reflected at just one angle.

When the target comprises a reflecting surface that provides diffuse reflection of an incident beam of electromagnetic radiation, preferably the target comprises a layer of paint, more preferably a layer of white paint.

In some embodiments the transmitter means, the detector means and the target are on a first substrate, the first substrate having a first major surface and a second opposing major surface.

Preferably at least one of the transmitter means, the detector means and the target are on the first major surface of the first substrate.

Preferably at least one of the transmitter means, the detector means and the target are on the second major surface of the first substrate.

Preferably the transmitter means, the detector means and the target are on the first major surface of the first substrate.

Preferably the detector means is between the transmitter means and the target.

Preferably the transmitter means is at a first distal end of the substrate; the target is at a second distal end of the substrate; and the detector means is between the transmitter means and the target.

Preferably the beam of electromagnetic radiation is emitted at an angle to a normal on the first substrate, the angle being greater than 40°, preferably between 40° and 80°, more preferably between 55° and 65°.

Preferably the first substrate comprises a plastic material.
Preferably the first substrate comprises a polyester.
Preferably the first substrate comprises PET.
Preferably the first substrate comprises a glass sheet, preferably a soda-lime-silica glass sheet. The glass sheet may be an annealed glass sheet, a thermally toughened glass sheet or a chemically strengthened glass sheet. The glass sheet may have a thickness between 0.5 mm and 20 mm.

In embodiments when the first substrate comprises a glass sheet, the device may be used as a pane in a window. The pane in the window may be a single pane, or the pane in the window may be spaced apart from another pane of glazing material.

When the device is used as a pane in a window, the surface is preferably a surface of the window.

Other embodiments of the third aspect of the present invention have other preferable features.

Preferably the target comprises a layer for diffusely reflecting electromagnetic radiation incident upon said target.

Preferably the transmitter means comprises a light emitting diode.

Preferably the transmitter means is operable at a wavelength between 380 nm and 1200 nm.

Preferably the detector means comprises a photodiode.
Preferably the detector means is operable to detect electromagnetic radiation at a wavelength between 380 nm and 1200 nm.

Preferably the device has a thickness less than 1 mm, preferably a thickness between 0.3 mm and 0.8 mm.

From a fourth aspect the present invention provides a window comprising a device according to the third aspect of the present invention, wherein the surface is a surface of the window.

From a fifth aspect the present invention provides a window comprising a device according to the third aspect of the present invention wherein the transmitter means, the detector means and the target are on a first substrate, the first substrate having a first major surface and a second opposing major surface, further wherein the first substrate is joined to the first pane of glazing material by an interlayer structure comprising at least one ply of adhesive interlayer material, in particular polyvinyl butyral (PVB).

BRIEF DESCRIPTION OF THE DRAWINGS

The invention will now be described with reference to the following figures (not to scale) in which, FIG. 1 shows a schematic isometric representation of a device for detecting mist (a mist sensor) on a surface of a window;

FIG. 2 shows a schematic plan view of the mist sensor shown in FIG. 1;

FIG. 3 shows a schematic cross-sectional view of the mist sensor shown in FIG. 2 through the line A-A' thereof;

FIG. 4 shows a schematic cross-sectional view of another mist sensor similar to the type shown in FIGS. 1 to 3;

FIG. 5 shows a schematic cross-sectional view of another mist sensor similar to the type shown in FIGS. 1 to 3;

FIG. 6 shows a schematic cross-sectional view of another mist sensor similar to the type shown in FIGS. 1 to 3;

FIG. 8 shows a schematic isometric exploded view of the laminated glazing shown in FIG. 7;

FIG. 11 shows a schematic exploded perspective view of another laminated glazing having three plies of adhesive interlayer material;

FIG. 12 shows a schematic cross-sectional view of the laminated glazing of FIG. 11 through the line B-B';

FIG. 1 shows a mist sensor 1 that may be incorporated into a window, in particular a laminated glazing as will be describe hereinafter. FIG. 2 is a plan view of the mist sensor 1 shown in FIG. 1 i.e. when viewed in the direction of arrow 2, which is normal to the first major surface 5 of the substrate 3.

With reference to FIGS. 1 and 2, the mist sensor 1 comprises a substrate 3 having a first major surface 5 and an opposing second major surface 7. In this example the substrate 3 is polyethylene terephthalate (PET) and is optically transparent. The thickness of the substrate 3 is about 0.2 mm and the substrate is relatively flexible.

Figure 7:
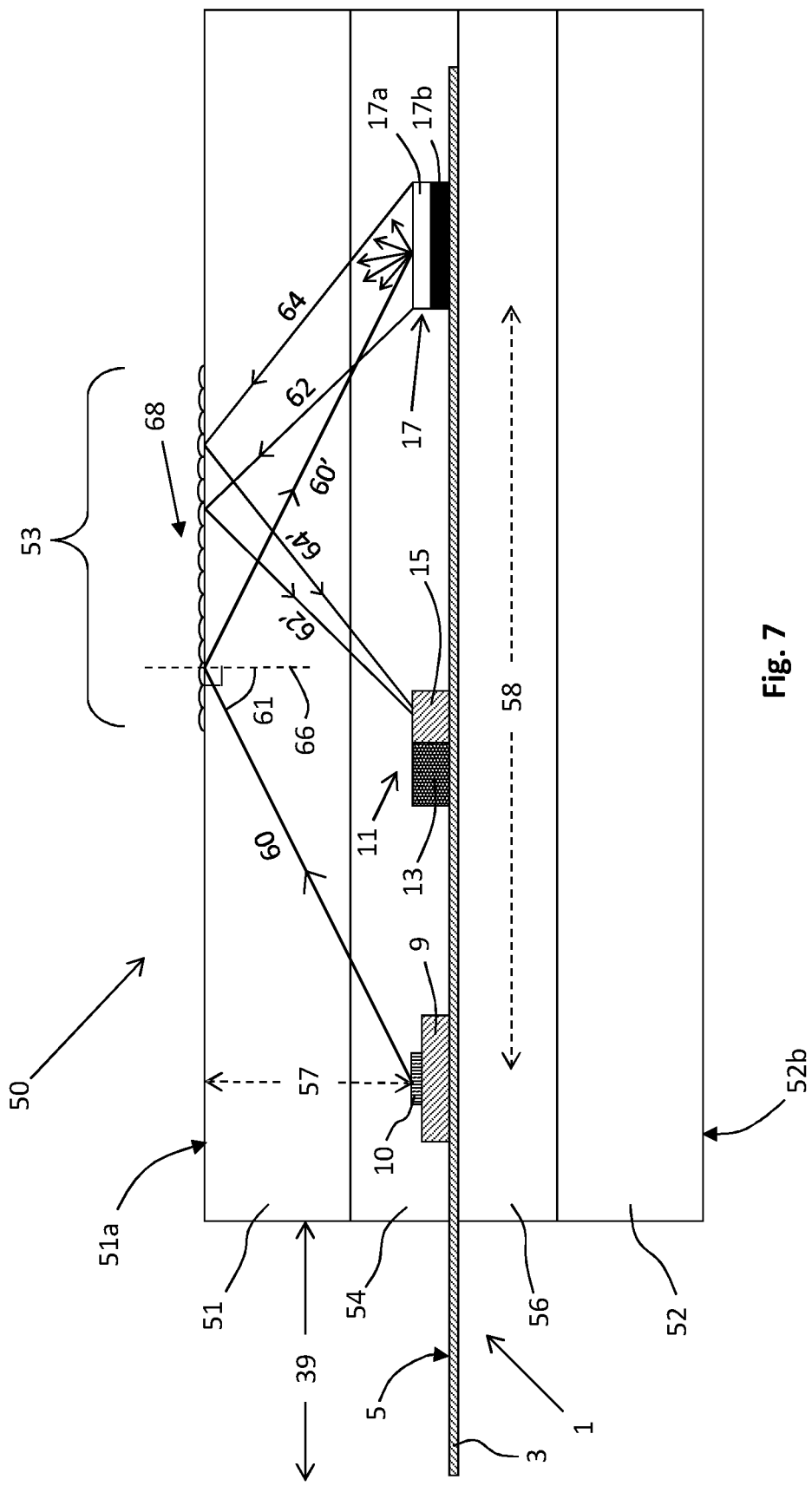
FIG. 7 shows a schematic cross-sectional view of a laminated glazing including the mist sensor shown in FIG. 1.

Fixed on the first major surface 5 of the substrate 3 is a light emitting diode (LED) 9 for producing a beam of light and a photodiode 11. The LED 9 has a suitable lens assembly 10 for directing the beam of light in the required direction. The LED 9 may not have a lens assembly. The photodiode 11 has a body portion 13 and a light sensitive portion 15. In the configuration shown, the body portion 13, which is not sensitive to light and is optically opaque to light, directly faces the LED 9 to help reduce any light from the LED 9 directly reaching the light sensitive portion 15 of the photodiode 11.

The LED 9 may be operable at infrared wavelengths, such as between 780 nm to 900 nm, with a suitable photodiode able to detect the wavelengths emitted by the LED.

A pair of first and second electrical contacts 19, 21 are disposed on the first major surface 5 of the substrate 3. The first electrical contact 19 is in electrical communication with the LED 9 via electrically conductive track 23 and the second electrical contact 21 is in electrical communication with the LED 9 via electrically conductive track 27. The first and second electrical contacts 19, 21 may be used to provide power to the LED 9 to generate light for the mist sensor 1 to be operable.

The first electrical contact 19 is also in electrical communication with the photodiode 11 via electrically conductive track 25. The electrically conductive track 25 is in electrical communication with electrically conductive track 23 via electrically conductive node 23'.

The second electrical contact 21 is also in electrical communication with the photodiode 11 via electrically conductive track 29. The electrically conductive track 25 is in electrical communication with electrically conductive track 27 via electrically conductive node 27'.

Additional circuitry may be provided in electrical communication with the or each electrical contact 19, 21 and the photodiode 11 so that a single pair of electrical contacts 19, 21 may be used to provide the required electrical power to both the LED 9 and the photodiode 11 such that each may function. Alternatively, the LED 9 and the photodiode 11 may be independently powered, each having a respective pair of electrical contacts.

The photodiode 11 has two output terminals 31' and 33'. An electrically conductive track 31 is in electrical communication at one end with the first output terminal 31' and at the other end with a third electrical contact 35. An electrically conductive track 33 is in electrical communication at one end with the second output terminal 33' and at the other end with a fourth electrical contact 37. The third and fourth electrical contacts are also disposed on the first major surface 5 in the same manner as the first and second electrical contacts 19, 21.

When the light sensitive portion 15 of the photodiode 11 detects light, a signal is sent to the first and second output terminals 31', 33', and consequently an electrical signal is measurable between the third and fourth electrical contacts 35, 37.

A target 17 is on the first major surface 5 of the substrate 3 such that the LED 9, the photodiode 11 and the target 17 lie along a straight line A-A', with the photodiode 11 being between the LED 9 and the target 17. In the plan view as shown in FIG. 2, the line A-A' lies along the longitudinal axis of symmetry of the substrate 3 (the substrate 3 having a rectangular outline in plan view when viewed in the direction of arrow 2, which is normal to the first major surface 5 of the substrate 3).

The target 17 has a rectangular shape, although other shapes may be used, for example square, circular, oval, a section of an annulus etc. The target 17 has a white optically opaque painted surface that is able to diffusely reflect light that is incident upon the target, for example light that is incident upon the target 17 in the direction of arrow 18, the arrow 18 being at an angle to a normal on the first major surface 5 of the substrate 3.

When incorporating the mist sensor 1 between two panes of glazing material, for example a laminated glazing, a portion 39 of the mist sensor 1 may extend beyond the periphery of the panes of glazing material to allow power to be provided to the first and second electrical contacts 19, 21 to power the LED 9 and photodiode 11, and to be able to measure the output of the photodiode by measuring the signal between the third and fourth electrical contacts 35, 37, the signal being a detection signal.

Each of the tracks 23, 25, 27, 29, 31, 33 and the nodes 23', 27' may be an electrically conductive ink that has been printed onto the first major surface 5 of the substrate 3. Alternatively, the tracks may be copper tracks of the type found in a conventional circuit board.

As will be described hereinafter, the mist sensor 1 may be used as a contact/proximity sensor.

In an alternative embodiment to that shown in FIG. 1, at least one of the electrically conductive tracks 23, 25, 27, 29, 31, 33 may be on the second major surface 7 of the substrate 3. For example, the electrically conductive tracks 23, 25, 27, 29, 31, 33 and the first, second, third and fourth electrical contacts may be on the second major surface 7, with the LED 9 and the photodiode 11 being on the first major surface 5. In such embodiments the electrically conductive pathway extends between the second and first major surfaces of the substrate.

FIG. 3 shows a cross-sectional view of the mist sensor 1 through the line A-A' of FIG. 2.

In this example, the target 17 can be seen to consist of two layers 17a and 17b. The layer 17b is a black paint that is in direct contact with the first major surface 5 of the substrate 3. On top of the layer 17b and coincident therewith is a layer 17a of white paint. The white paint layer 17a has a scattering surface and is able to diffusely reflect light incident thereon i.e. the white paint layer 17a is a diffuse reflector of light.

Light from the LED 9 does not have a direct path from the LED 9 to the light sensitive portion 15 of the photodiode because of the opaque nature of the body portion 13 being between the light sensitive portion 15 and the LED 9. Although in this example the body portion 13 is integral with the photodiode 13, it is possible to use a separate element between the light sensitive portion 15 of the photodiode 11 and the LED 9 to block light from having a direct path from the LED 9 to the light sensitive portion 15. Such an additional element may be instead of, or as well as, the body portion 13.

The body portion 13 also prevents light from the LED 9 having a direct path to the target 17, in particular the layer 17a. The body portion 13 effectively ensures the target 17 is in shadow from direct light from the LED 9.

In an alternative embodiment mist sensor 1' as shown in FIG. 4, the photodiode 11 is re-positioned so the target 17 is between the LED 9 and the photodiode 11. In FIG. 4, the photodiode 11 has been rotated through 180° so that the light sensitive portion 15 faces the LED 9. To reduce the potential for stray light from the LED 9 reaching the light sensitive portion 15 of the photodiode 11, a light blocking element 41 has been disposed on the first major surface 5 of the substrate 3 between the LED 9 and the target 7 (and as can be seen, between the LED 9 and the photodiode 11). Whilst the photodiode 11 may be configured in the same was as shown in FIG. 3 i.e. so that the body portion 13 faces the LED 9, this may result in the photodiode having reduced sensitivity. The light blocking portion may be a printed ink on the first or second major surface of the substrate that is opaque to light emitted from the LED 9 and/or other external sources (not including light reflected from the target).

The mist sensor 1' may be used as a contact/proximity sensor.

In another alternative embodiment mist sensor 1" as shown in FIG. 5, the photodiode 11 and target 17 are on the first major surface 5 of the optically transparent PET substrate 3. However, in contrast to the mist sensors 1 and 1' previously described, an LED 9' is on the second major surface 7 of the PET substrate 3. The LED 9' includes a suitable lens 10' and is configured to emit a beam of light in the direction of the second major surface 7 to first major surface 5 i.e. through the substrate 3.

The mist sensor 1" may be used as a contact/proximity sensor.

In another alternative embodiment mist sensor 1''' as shown in FIG. 6, the photodiode 11 and target 17 are on the first major surface 5' of the optically opaque substrate 3' and a LED 9' is on the second major surface 7' of the optically opaque substrate 3'. The LED 9' includes a suitable lens 10' and is configured to emit a beam of light in the direction of the second major surface 7' to first major surface 5'.

Since the substrate 3' is optically opaque, for example the substrate 3' is polyimide, in order for light from LED 9' to emerge from surface 5', there is an opening 12 in the substrate (i.e. an orifice or hole) so that light from LED 9' can pass through the substrate 3' via the opening 12.

In this embodiment, the target 17 only has a single layer 17a of white paint as described above because the substrate 3' is optically opaque.

The target may be provided with a second layer between the layer 17a and the substrate 3' if desired.

The mist sensor 1''' may be used as a contact/proximity sensor.

The basic principle of operation of the mist sensor 1 is now described with reference to FIGS. 7 and 8.

FIG. 7 shows a schematic cross-sectional representation of a laminated glazing 50 incorporating the mist sensor 1 of FIG. 1. FIG. 8 is a schematic isometric exploded view of the laminated glazing 50.

With reference to FIGS. 7 and 8, the laminated glazing 50 comprises a first pane of glass 51 joined to a second pane of glass 52 by means of first and second adhesive interlayer plies 54, 56. Suitable material for the adhesive interlayer plies includes PVB and EVA. The adhesive interlayer plies 54, 56 may each be the same material or different materials. Suitably the glass is soda-lime-silica glass.

Between the first and second adhesive interlayer plies 54, 56 is a mist sensor 1 as described with reference to FIG. 1. A portion 39 of the mist sensor extends outwardly from the adhesive interlayer plies 54, 56 to allow the mist sensor to be powered via the first and second electrical contacts 19, 21 and to measure the signal from the photodiode (i.e. by connecting suitable measurement apparatus to the third and fourth electrical contacts 35, 37 to measure the detection signal).

In this example the panes of glass 51, 52 are both flat, although in an alternative embodiment the panes of glass 51, 52 may be curved as in a vehicle windscreen.

With particular reference to FIG. 8, the first pane of glass 51 has a first major surface 51a and an opposing second major surface 51b. The second pane of glass 52 has a first major surface 52a and an opposing second major surface 52b.

Each of the adhesive interlayer plies 54, 56 are coextensive with each other and with the panes of glass 51, 52 such that the panes of glass and the adhesive interlayer plies shown in FIG. 8 are congruently stacked.

The glass panes 51, 52 are each 2.1 mm thick and the adhesive interlayer plies 54, 56 are each 0.38 mm thick. The glass panes 51, 52 and/or the interlayer plies 54, 56 may have different thicknesses. Each of the glass panes 51, 52 may be 0.7 mm to 4 mm thick. Each of the adhesive interlayer plies 54, 56 may be 0.3 mm to 1.2 mm thick, for example 0.76 mm thick.

As illustrated in FIG. 7, a region 53 of the first major surface 51a of the pane of glass 51 has a layer of mist 68 thereon.

The mist sensor 1 operates as follows to detect the presence of mist 68 on the region 53 of the first major surface 51a. Reference is also made to FIG. 1.

An electrical signal is applied to the first and second electrical contacts 19, 21 to power the LED 9. Once powered, the LED 9 emits a beam of light 60 towards the first major surface 51a of the first pane of glass 51. The lens 10 helps provide a suitable angle of incidence, although the LED 9 may act as a point source with beams of light being emitting in many directions. The LED 9 may emit a diverging beam of light.

In this example, the first adhesive interlayer ply 54 is PVB and the glass panes 51, 52 have a soda-lime-silica composition. As such, the refractive indices of the first adhesive interlayer 54 and the first glass pane 51 are similar so there is little, if any, refraction as the beam of light 60 passes from the LED 9 to the first major surface 51a. Suitable correction for the path of the beam of light may be made in the event the amount of refraction is not negligible. The PVB may also influence the effectiveness of the lens assembly 10, such that the LED 9 may act more like a point source.

The beam of light 60 is at an angle of incidence 61 to a normal 66 on the first major surface 51a of the first pane of glass 51.

The angle of incidence 61 of the beam of light 60 is selected such that there is total internal reflection of the beam of light 60 from the glass surface 51a.

Given that in use, the laminated glazing 50 will be positioned in an air environment, a beam of light 60 directed towards the first major surface 51a of the first pane of glass 51 will be totally internally reflected for an angle of incidence given by:

$$\theta_c > \sin^{-1}\left(\frac{n_2}{n_1}\right) \quad (1)$$

where $n_2$ is the refractive index of air and $n_1$ is the refractive index of the glass making up glass pane 51. At 540 nm, using $n_2$=1 and $n_1$=1.52, if $\theta_c$ is greater than about 41.1° there will be total internal reflection from a glass/air boundary.

However, when mist is on the first major surface 51a of the first pane of glass 51, the value of $n_2$ is that of water (=1.3), and not air (=1). At 540 nm, using $n_2$=1.3 and $n_1$=1.52, if $\theta_c$ is greater than about 58.8° there will be total internal reflection from the glass/water boundary.

To be operable in the presence of mist on the first major surface 51a of the first pane of glass 51 the angle of incidence 61 of the beam of light 60 is set at about 60° (i.e. greater than the value $\theta_c$ for a glass/water boundary) to ensure total internal reflection of the beam of light 60 even in the presence of water on the first major surface 51a of the first pane of glass 51.

Given that the angle of incidence 61 is set at about 60°, the beam of light 60 undergoes total internal reflection upon striking the glass/air or glass/water boundary at the first major surface 51a. The beam of light 60 is reflected as beam of light 60' towards the target 17.

Upon striking the white layer 17a of the target 17, the beam of light is scattered in all directions towards the first major surface 51a of the first glass pane because the layer 17a is a diffuse reflector and the target 17 is illuminated by the beam of light 60 (which is reflected as beam 60'). Due to the layer 17b of black paint there is no light scattered towards the first major surface 52a of the second glass pane 52.

Some of the light that is reflected off the white layer 17a of the target 17 is directed towards the first major surface 51a of the first glass pane 51 and follows a path thereto.

Beams of reflected light 62, 64 from the illuminated target strike the first major surface 51a in the region 53 to define a "sensing area", the size of which may be altered by altering the size of the target 17. Due to the way the light is emitted from the LED 9, for example when the LED 9 acts as a point source, it is possible to illuminate a portion of the target (which is may be the entire target) because light beams emitted from the LED 9 have different angles of incidence to a normal on the first major surface 51a. To illustrate this, the beams of reflected light 62, 64 are shown as originating from the periphery of the target.

Figure 9:
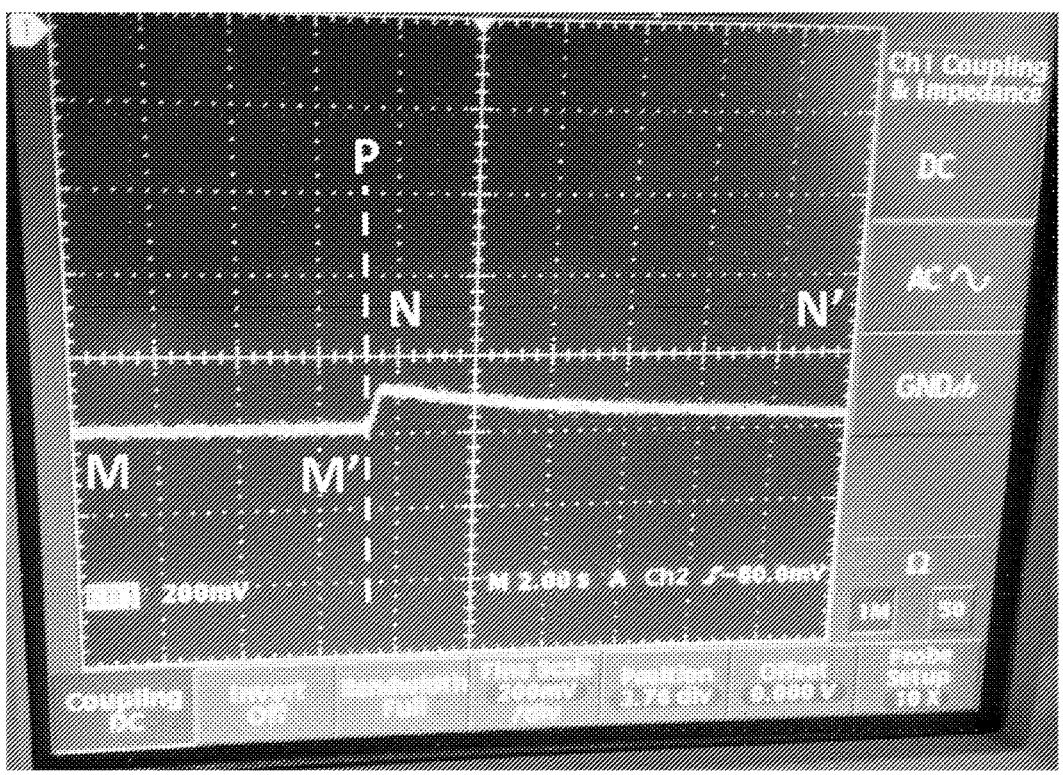
FIG. 9 shows the variation with time of the output signal from a mist sensor of the type shown in FIG. 1 incorporated into a laminated glazing as shown in FIG. 7 when detecting mist on a surface of the laminated glazing.
Figure 10:
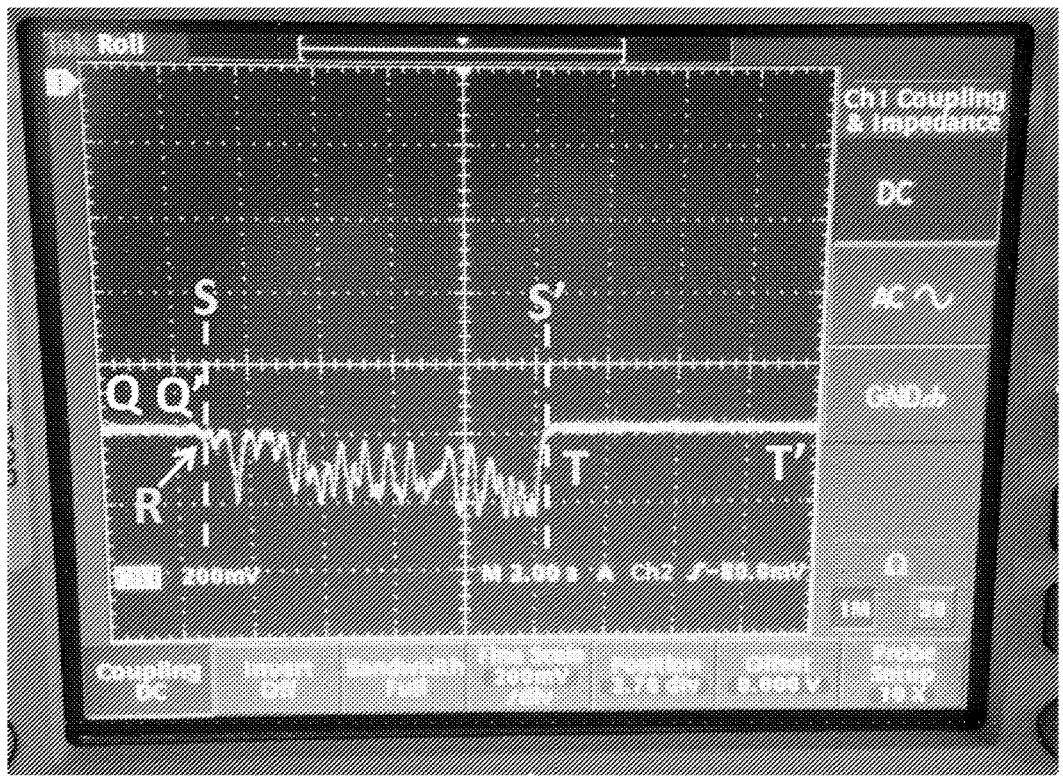
FIG. 10 shows the variation with time of the output signal from a mist sensor of the type shown in FIG. 1 incorporated into a laminated glazing as shown in FIG. 7 when detecting physical contact with a surface of the laminated glazing.

There is some reflection of the beam of light 62 from illuminated target off the first major surface 51a as reflected beam 62'. Likewise, there is some reflection of the beam of light 64 from the illuminated target off the first major surface 51a as reflected beam 64'. Although not illustrated in FIG. 7, some of the light reflected from the target 17 is transmitted through the first major surface 51a of the first pane of glass 51. This light may be useful for using the mist sensor 1 as a contact sensor or proximity sensor, by utilising reflections off an object, such as a human finger contacting or proximal the first major surface 51a, for detection by the photodiode 11. This is described in more detail hereinafter when FIGS. 9 and 10 are discussed.

The photodiode 11 is positioned between the LED 9 and the target 17 such that the light sensitive portion 15 is able to detect the reflected beams 62', 64'. The optically opaque body portion 13 shields the light sensitive portion 15 from any direct light from the LED 9.

Where the first major surface 51a is illuminated by reflected light from the target 17, the photodiode 11 is able to detect changes that take place on said surface and/or proximal thereto, to provide an output signal at terminals 31', 33' of the photodiode 11 measurable at the third and fourth contacts 35, 37. This is illustrated in FIGS. 9 and 10.

Shown on FIG. 7 is distance 57 between the LED 9 and the first major surface 51a of the first glass pane 51. Assuming the thickness of the LED 9 (and/or lens 10) is negligible compared to the combined thickness of the first adhesive interlayer ply 54 and first glass pane 51, the distance 57 is essentially the combined thickness of the first adhesive interlayer ply 54 and first glass pane 51. In this example the distance 57 is 2.48 mm (=2.1 mm+0.38 mm). It is possible to take into account the thickness of the LED 9 and/or lens 10 as appropriate.

The distance 57 represents the minimum distance between the LED 9 and the first major surface 51a of the first glass pane 51. Or put another way, the distance 57 represents the shortest optical path from the LED 9 to the first major surface 51a of the first glass pane 51.

The spacing of the edge of the layer 17a nearest to the photodiode 11 is spaced from the LED 9 by distance 58. If desired, it is possible to use equation (1) and the distance 57 to determine a minimum distance 58 for the edge of the reflective layer of the target (layer 17a) because for an angle of incidence to a normal on the first major surface 51a of the glass pane 51 that is less than the critical angle, an incident beam is not total internally reflected, but instead passes out through the first major surface 51a of the first pane of glass 51. For a glass/water boundary an incident beam undergoes total internal reflection for an angle of incidence of about 58.8° for an incident beam having a wavelength of 540 nm.

Therefore in the laminated glazing shown in FIG. 7, the shortest distance away from the LED 9 over which a beam that has undergone total internal reflection may strike the substrate 3 is:

$$2 \times \text{distance } 57 \times \tan(\theta_c) \quad (2)$$

With distance 57=2.48 mm and $\theta_c$=58.8°, the distance 58 is about 8.2 mm. If the edge of the layer 17a is closer to the LED 9, no light at a wavelength of 540 nm will have undergone total internal reflection and so will not be able to strike the layer 17a that is closer to the LED 9.

If the LED 9 also emits a beam of light at an angle of incidence of 70° to a normal on the first major surface 51a of the first glass pane 51, using equation (2) the distance 58 would be about 13.6 mm (because distance 57 is about 2.48 mm). Therefore, if the LED 9 emitted beams of light having an angle of incidence to a normal on the first major surface 51a of the first glass pane 51 between 58.8° and 70°, the target may have a width of at least (13.6 mm−8.2 mm)=5.4 mm.

The position of the photodiode 11 between the LED 9 and the target 17 may also be varied to provide improved detection of the reflected beams 62', 64' and improved shadowing of the target 11 from light from LED 9 by means of the opaque body portion 13.

As will be readily apparent, when the LED 9 acts as a point source with light essentially emitted at all angles away from the LED 9, the edge of the layer 17a closest to the LED will take the form of a portion of a circle.

This analysis may be useful when determining the dimensions of the reflective layer of the target to avoid using an unnecessarily large target which may be desirable in certain applications.

Another factor that may be taken into consideration with the laminated glazing 50 is that when the LED 9 emits light at many different angles, for example when the LED 9 acts essentially as a point source, in addition to light that is total internally reflected as described above, some light from LED 9 may be transmitted through the first pane of glass 51 to emerge through the first major surface 51a such that there is no path to the light sensitive portion 15 of the photodiode 11. However, if an object was subsequently positioned in the path of such light that has been transmitted through the first major surface 51a of the first pane of glass Slit would be reflected therefrom with the potential to be detected by the light sensitive portion 15 of the photodiode 11. As such, this provides a benefit that the mist sensor 1 may be used to discriminate between a signal due to the presence of mist 68 and a signal due to the presence of an object on or near the first major surface 51a of the first pane of glass 51, probably because the amount of reflection in each case will be different. When used in this way, it will be readily apparent that a target is not essential because the light being used to sense the presence of an object contacting or proximal to the glass surface 51a is not reflected off the target 7 but instead passes through the ply 54 and the pane 51.

FIG. 9 shows the variation with time of the output signal (i.e. the detection signal) from a mist sensor of the type shown in FIG. 1 incorporated into a laminated glazing made in accordance with FIGS. 7 and 8. An oscilloscope was used to measure the electrical signal between the third and fourth electrical contacts 35, 37 when the LED 9 and photodiode 11 were suitably powered to be operational.

When a person breathed onto the first major surface 51a of the laminated glazing 50 in the region thereof illuminated by light reflected from the target, mist formed on said surface and caused a change in the light from the LED 9 reaching the photodiode 11.

The input power to the LED 9 was modulated and a synchronous detection circuit used to measure the response of the photodiode 11 to changes in the amount of light reflected off the first major surface 51a from the illuminated target 7. Synchronous detection helps eliminate stray light levels that may also reach the photodiode 11 and is a conventional technique used for measuring reflection in the presence of strong background light.

As FIG. 9 shows, with no mist on the first major surface 51a between the time interval M-M', the detection signal is essentially constant on the oscilloscope trace (i.e. a background level). However, upon breathing onto the first major surface 51a (at point P signified by a dashed line), the detected signal goes more positive from the baseline level and then slowly decays back to the background level in the time interval N-N' as the mist cleared from the first major surface 51a.

FIG. 10 shows the variation with time of the output signal (i.e. the detection signal) of the mist sensor in the same glazing used to produce the output signal shown in FIG. 9.

The output signal in FIG. 10 was produced when the first major surface 51a of the laminated glazing 51 in the region illuminated by light reflected from the target 17 was touched by a human hand and rubbed with a cloth. If the laminated glazing 50 was a vehicle windscreen, and the first major surface 51a was the inner facing surface (i.e. facing into the passenger compartment of the vehicle in which the windscreen was installed), the first major surface 51a may by touched by a human hand or cleaned with a cloth or the like. As such, this experiment was used to determine the type of signal from the mist sensor upon such actions.

The output signal shown in FIG. 10 illustrates that both of these actions affect the signal that is measured by the photodiode 11, but in a different way to mist on the first major surface 51a.

Initially (as also was the case in the FIG. 9), the signal detected is at a baseline in the time interval Q-Q'. Upon starting the two actions described above (at point R), the signal changes to become negative (and not positive as shown in FIG. 9) from the background level in the time interval S-S'. Secondly, the changes occur much more rapidly compared to the slow decay back to the baseline level seen in FIG. 9. Either or both of these changes (shown in time interval S-S') may be used to differentiate this type of signal (produced by physical contact with the glazing surface) from the signal produced by the presence of mist on the surface. Note that in the time interval T-T' the glazing was in an "at rest state" (no mist, no physical contact therewith) and the baseline signal from the mist sensor returned to the same level as in time interval Q-Q'.

This experiment therefore shows that the mist sensor 1 is able to detect the presence of an object, for example when the human hand (i.e. a finger) or cloth contacts the laminated glazing 51 in the region illuminated by light reflected from the target 17. As such, the mist sensor may be used as a sensor for detecting the presence of an object such as a user's hand contacting or proximal to the first pane of glass 51 in the region illuminated by light reflected from the target 17. Suitable circuitry and/or software algorithms may be used to adapt the use of the device as either a mist sensor, a contact/proximity sensor, or both. The device may selectively be used as a mist sensor and a contact/proximity sensor.

As discussed above, for any light from the LED 9 that, instead of undergoing total internal reflection from the glass/air or glass/water interface, is transmitted through the glass/air or glass/water interface, such transmitted light may be reflected off an object positioned near to the interface for detection by the photodiode to help discriminate between such an object and the presence of mist on the glazing surface.

FIG. 11 shows a schematic exploded perspective view of another laminated glazing 70. FIG. 12 shows a schematic cross-sectional view of the laminated glazing 70 of FIG. 11 through the line B-B'.

In this example the laminated glazing 70 comprises a first glass pane 71 joined to a second glass pane 72 by means on an interlayer structure 73. The interlayer structure 73 comprises three plies of adhesive interlayer material (i.e. PVB, EVA or combinations thereof) 74, 75 and 76. The first ply of adhesive interlayer material is coextensive with the first glass pane 71. The second ply of adhesive interlayer material is coextensive with the second pane of glass 72. The third ply of adhesive interlayer material 75 is located between the first and second sheets of adhesive interlayer material 74, 76 and has a cut-out region therein to accommodate the mist sensor 1. The cut-out region is along one edge of the third sheet of adhesive interlayer material and the other three edges thereof are aligned with the respective edges of the first and second plies of adhesive interlayer material.

FIG. 11 is representative of the stack of unlaminated components that may be laminated together using conventional lamination processes, for example using suitable high temperature and pressure.

In the final laminated glazing as shown in FIG. 12, the mist sensor 1 is between the first and second plies of adhesive interlayer material 74, 76 and is located in the cut-out region of the third ply of adhesive interlayer material 75. Such a construction makes lamination simpler as the extra third ply of adhesive interlayer material (compared to the two-ply adhesive interlayer structure of the laminated glazing 50) makes it easier to accommodate the thickness of the mist sensor 1 in between the first and second plies of adhesive interlayer material.

In the final laminated glazing 70 the first ply of adhesive interlayer material 74 is adjacent and in contact with the first glass pane 71 and the second ply of adhesive interlayer material 76 is adjacent to and in contact with the second glass pane 72. The third ply of adhesive interlayer material 75 is in contact with both the first and second plies of adhesive interlayer material 74, 76.

The mist sensor 1 included in the laminated glazing 70 functions in the same way as described for the mist sensor 1 in the laminated glazing 50 shown in FIG. 7.

Figure 13:
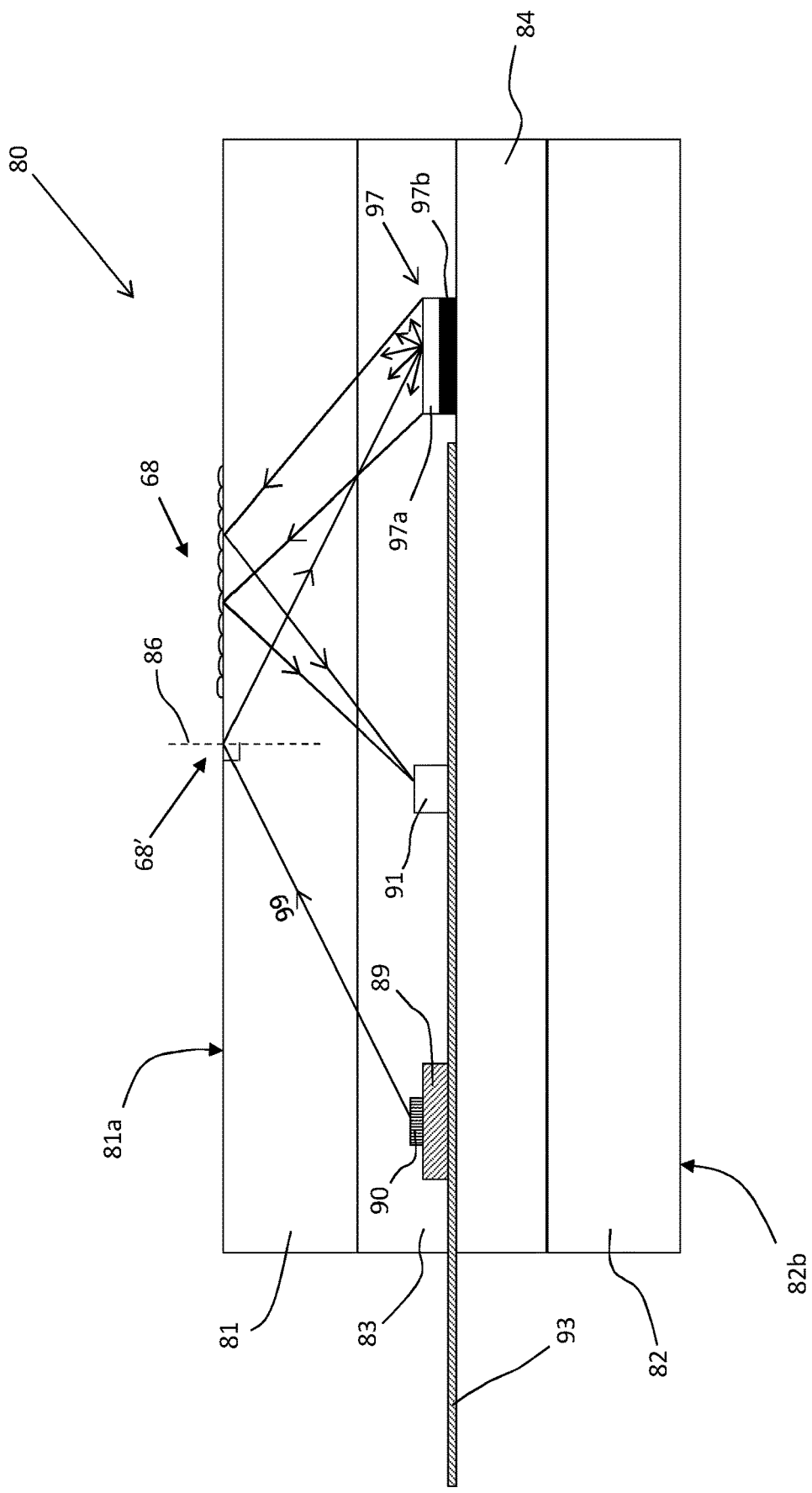
FIG. 13 shows a schematic cross-sectional view of another laminated glazing incorporating a different mist sensor.

FIG. 13 shows another laminated glazing 80 in accordance with the present invention. The laminated glazing 80 is similar to the laminated glazing 50 except that the mist sensor that is between the first and second glass panes 81, 82 has a part where the LED 89 and the photodiode 91 are on a substrate 93 between first and second plies of PVB 83, 84. However the target 97 in this example is provided on the surface of the second ply of PVB 84 such that the target 97 is also between the first and second plies of PVB but is not on the substrate 93.

The two-part mist sensor of laminated glazing 80 functions in the same manner as described with reference to FIG. 7. The LED 89 has a lens portion 90 for directing a beam of light emitted therefrom towards the major surface 81*a* of the glass pane 81. The angle of incidence of the emitted beam 99 to a normal 86 on the major surface 81*a* is greater than the critical angle for a glass/water interface so even though there is a region 68' of the major surface 81*a* void of mist, the beam 99 reflects onto the target 97 as previously described for non-specular reflection therefrom. Again, the target 97 has two layers, a white upper layer 97*a* for direct illumination from light beam 99 reflected off the major surface 81*a*, and a lower black, optically opaque layer 97*b* to prevent the target being illuminated from light passing through the major surface 82*b* of the glass pane 82.

Prior to lamination, the target 97 may be suitably positioned on the first PVB ply 83 or the second PVB ply 84. For a two-layer target as shown in FIG. 13, prior to lamination one layer of the target may be on the first PVB ply 83 and the other layer of the target on the second PVB ply 84 such that the two layers are suitably aligned in the final laminated glazing.

Given that the basic operation of the two part mist sensor in the laminated glazing 80 is essentially the same as that of the mist sensor 1 in the laminated glazing 50, the two part mist sensor may also be used as a contact/proximity sensor for detecting the presence of an object such as a user's hand contacting or proximal to the first pane of glass 81 in the region illuminated by light reflected from the target 97.

Figure 14:
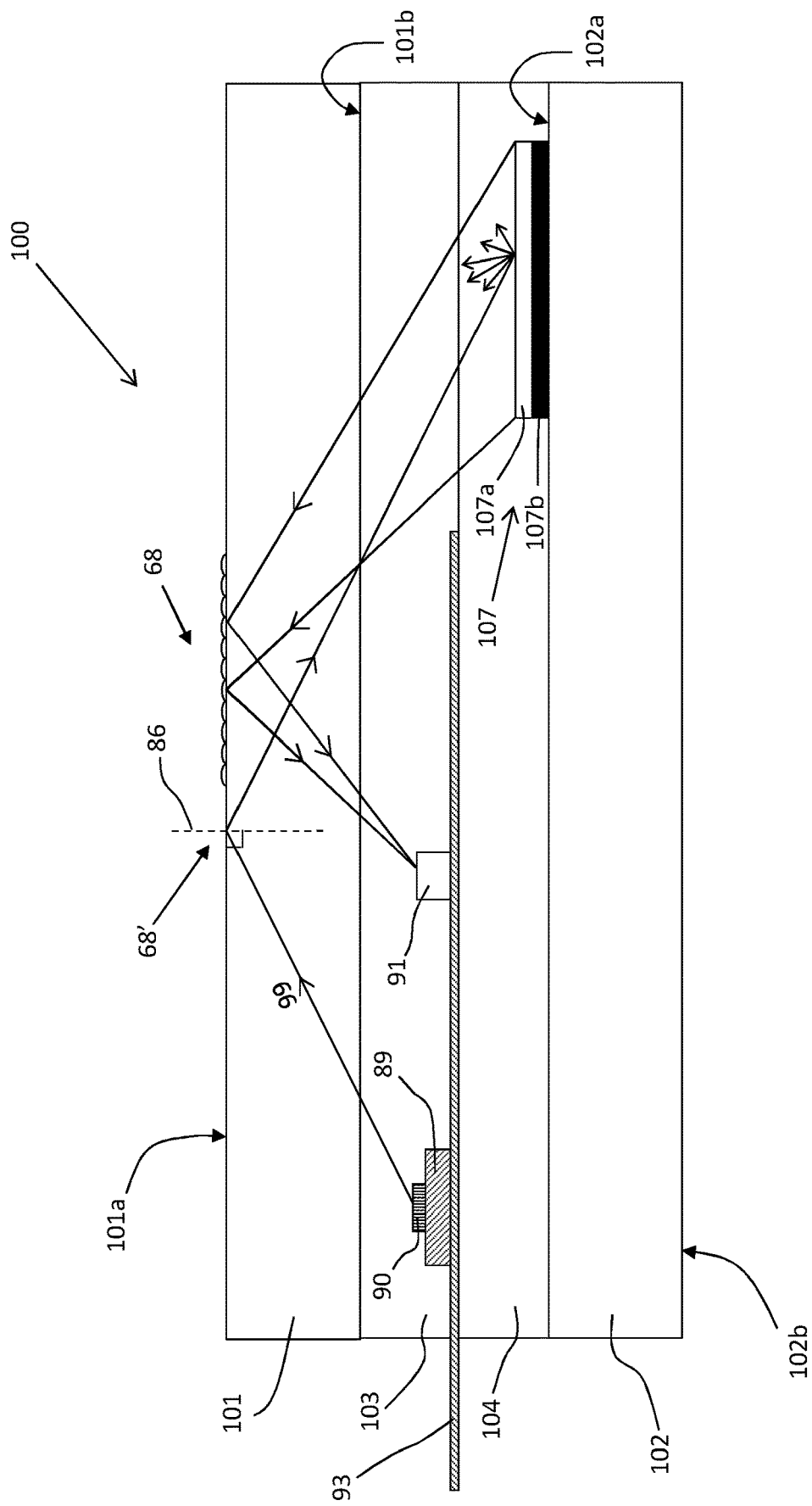
FIG. 14 shows a schematic cross-sectional view of another laminated glazing incorporating a different mist sensor.

FIG. 14 shows another laminated glazing 100 in accordance with the present invention. This laminated glazing is similar to the laminated glazing 80 except that instead of the target being on one of the surfaces of the PVB plies (or other adhesive interlayer material) such that the target is between the two PVB plies, the target is on the first major surface of the second pane of glass.

The laminated glazing 100 has first and second glass panes 101, 102 joined together by two plies of adhesive interlayer material 103, 104, such as PVB. The first glass pane 101 has a first major surface 101*a* and an opposing second major surface 101*b*. A layer of mist 68 is on a region of the first major surface 101*a* of the first glass pane 101. The second glass pane 102 has a first major surface 102*a* and a second opposing major surface 102*b*. The laminated glazing 100 is arranged such that the second major surface 101*b* of the first glass pane 101 faces the first major surface 102*a* of the second glass pane 102.

The same substrate 93, LED 89, lens 90 and photodiode 91 as described with reference to FIG. 13 is laminated between the first and second plies of adhesive interlayer material 103, 104.

In this example a target 107 is disposed on the first major surface 102a of the second glass pane 102. The target 107 has a first layer 107a of white paint that scatters incident light thereon, thereby providing a surface that diffusely reflects light. Between the second glass pane 102 and the first layer 107a the target has a second layer of black, optically opaque paint 107b. In this example the second layer 107b is in direct contact on one side with the first layer 107a and on the opposite side with the first major surface 102a of the second glass pane.

This two-part mist sensor works in essentially the same manner as described with reference to FIG. 7.

Given that the basic operation of the two part mist sensor in the laminated glazing 100 is essentially the same as that of the mist sensor 1 in the laminated glazing 50, the two part mist sensor may also be used as a contact/proximity sensor for detecting the presence of an object such as a user's hand contacting or proximal to the first pane of glass 101 in the region illuminated by light reflected from the target 107.

In an alternative to the embodiment shown in FIG. 14, the target may be disposed on the second major surface 101b of the first glass pane 101 instead of on the first major surface 102a of the second glass pane 102.

Figure 15:
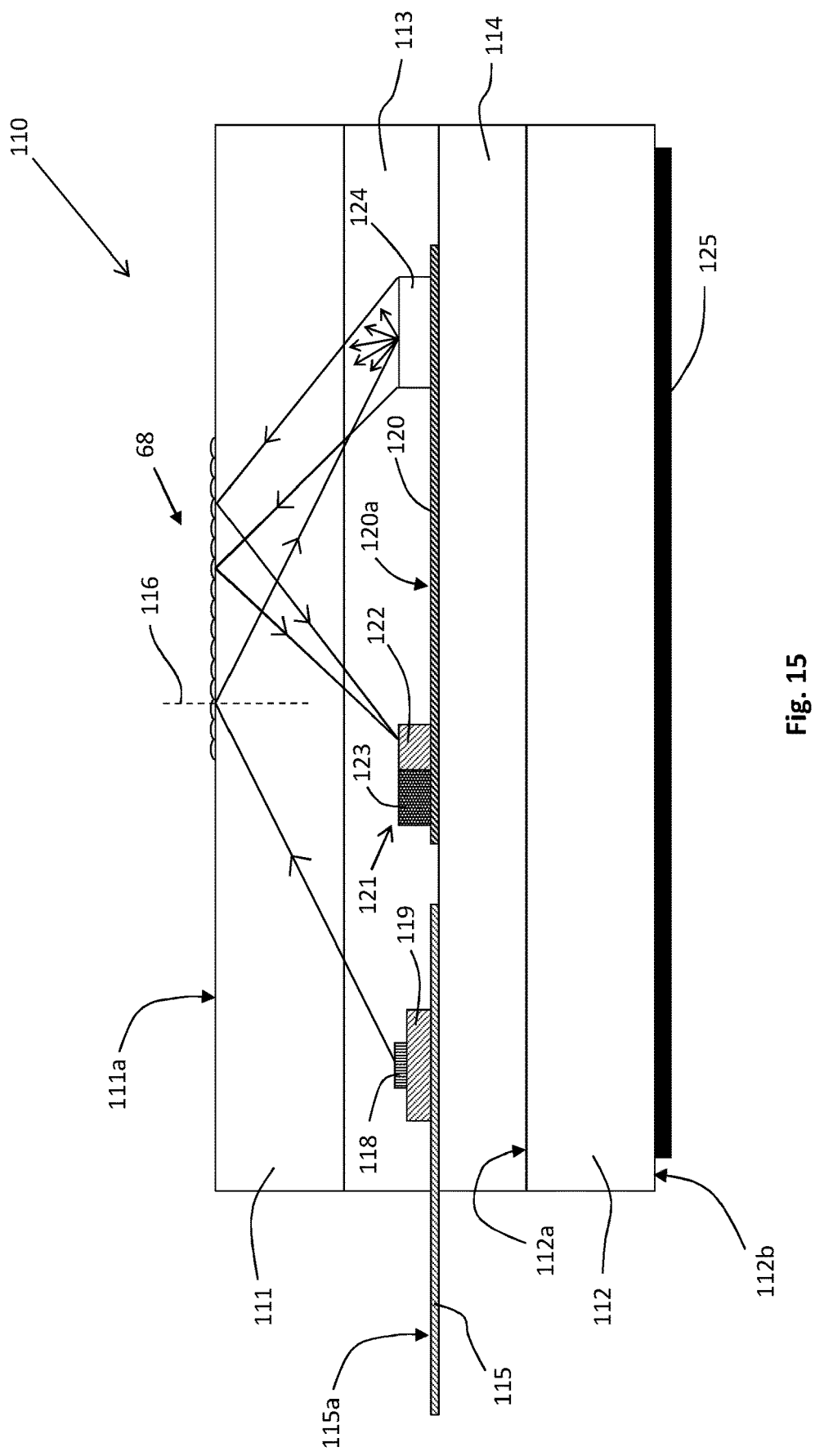
FIG. 15 shows a schematic cross-sectional view of another laminated glazing incorporating a different mist sensor.

FIG. 15 shows another laminated glazing 110 in accordance with the present invention.

The laminated glazing 110 has a first pane of glass 111 joined to a second pane of glass 112 by means of a first adhesive interlayer ply 113 and a second adhesive interlayer ply 114. In this example each adhesive interlayer ply 113, 114 is PVB. The first pane of glass has a first major surface 111a.

Each pane of glass 111, 112 is essentially flat or planar but each may be curved.

Between the first and second adhesive plies 113, 114 is a first substrate 115 having a first major surface 115a on which are electrically conductive pathways in electrical communication with an LED 119. The LED 119 has a lens assembly 118 for directing light emitted from the LED 119 at an appropriate angle of incidence to a normal 116 on the first major surface 111a.

Also in between the first and second adhesive layers 113, 114 is a second substrate 120 physically separate to the first substrate 115. The second substrate 120 has a first major surface 120a. On the first major substrate 120a is a photodiode 121 having a light sensitive portion 122 and an opaque body portion 123. Electrically conductive pathways are on the first major surface 120a to provide electrical inputs/outputs for the photodiode 121.

Also, on the first major surface 120a is a target 124. The target 124 is a layer of white paint that scatters light and provides a diffuse reflecting surface.

Although not shown on FIG. 15, the second substrate 120 has a portion that extends beyond the edges of the adhesive interlayer plies 113, 114 to allow electrical connections to be made to the photodiode 121.

On the exposed major surface 112b of the second glass pane 112, there is a layer of optically opaque ink 125. The layer of optically opaque ink 125 may be part of an obscuration band of the type used on automotive glazings. The layer of optically opaque ink 125 reduces the need for the target to have an optically opaque layer between the light scattering layer and the adhesive ply 114, although the target may have a two-layer configuration as shown for target 17 in FIG. 3.

It will also be readily apparent that a layer of optically opaque ink 125 may be provided in the same position on the other laminated glazings described herein, for example for the laminated glazing 50 shown in FIG. 7, on the second major surface 52b of the second pane of glass 52.

The layer of optically opaque ink 125 may also be disposed on the first major surface 112a of the second glass pane 112.

The two substrates 115, 120 and associated components thereon are part of a two-part mist sensor in accordance with the present invention. The two-part mist sensor operates in essentially the same way as the mist sensor 1 described in relation to FIG. 7 to detect mist 68 on the major surface 111a. The light paths from the LED 119 to the major surface 111a, from the major surface 111a to the target 124, from the target 124 to the major surface 111a and from the major surface 111a to the photodiode 121 are shown to illustrate this.

Given that the basic operation of the two part mist sensor in the laminated glazing 110 is essentially the same as that of the mist sensor 1 in the laminated glazing 50, the two part mist sensor may also be used as a contact/proximity sensor for detecting the presence of an object such as a user's hand contacting or proximal to the first pane of glass 111 in the region illuminated by light reflected from the target 124.

Figure 16:
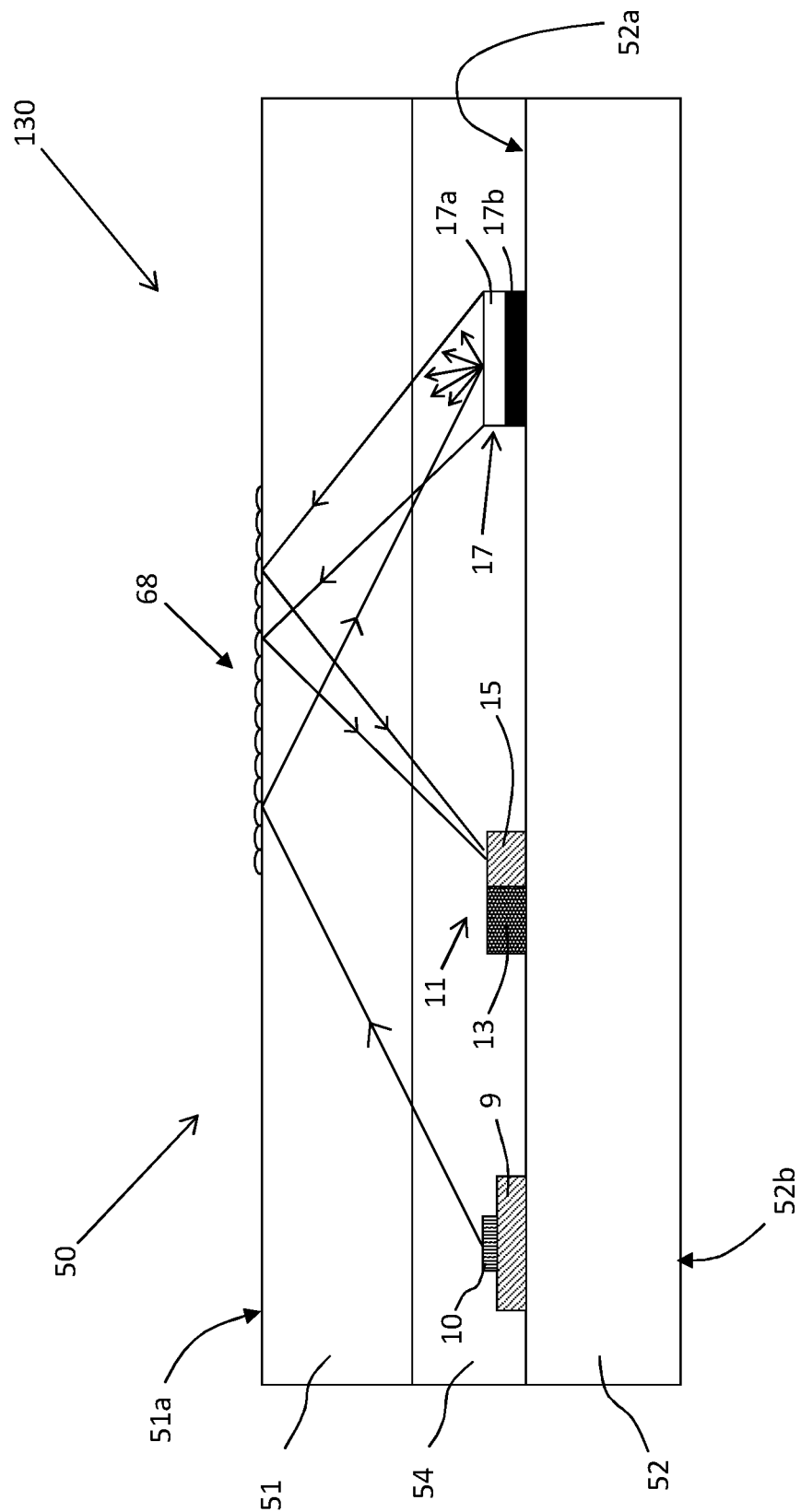
FIG. 16 shows a schematic cross-sectional view of another laminated glazing incorporating a different mist sensor.

FIG. 16 shows another laminated glazing 130 comprising a mist sensor that operates in essentially the same way as the mist sensor 1 described with reference to FIG. 7. However, in contrast to the laminated glazing 50 described with reference to FIG. 7, in the laminated glazing 130 the LED 9, the photodiode 11 and the target 17 are not on a separate substrate, but are instead on the first major surface 52a of the second glass pane 52.

Electrically conductive pathways are on the first major surface 52a of the glass pane 52 and allow electrical connections to be made to the LED 9 and the photodiode 11. The electrically conductive pathways may be in the form of a conductive ink, which may be optically opaque, or a transparent electrically conductive coating i.e. an optically transparent electrically conductive coating. It is known in the art to sectionalise such a transparent electrically conductive coating comprising ITO, tin oxide or the like that has been deposited over a major surface of a glass sheet to provide electrically conductive pathways for electrically actuated components subsequently mounted to said sectionalised electrically conductive coating.

The LED 9 also has a lens 10 for directing a beam of light emitted from the LED as previously described, but may not have a lens. The photodiode 11 and target 17 are also as previously described.

Given that the basic operation of the mist sensor in the laminated glazing 130 is essentially the same as that of the mist sensor 1 in the laminated glazing 50, the mist sensor may also be used as a contact/proximity sensor for detecting the presence of an object such as a user's hand contacting or proximal to the first pane of glass 51 in the region illuminated by light reflected from the target 17.

Figure 17:
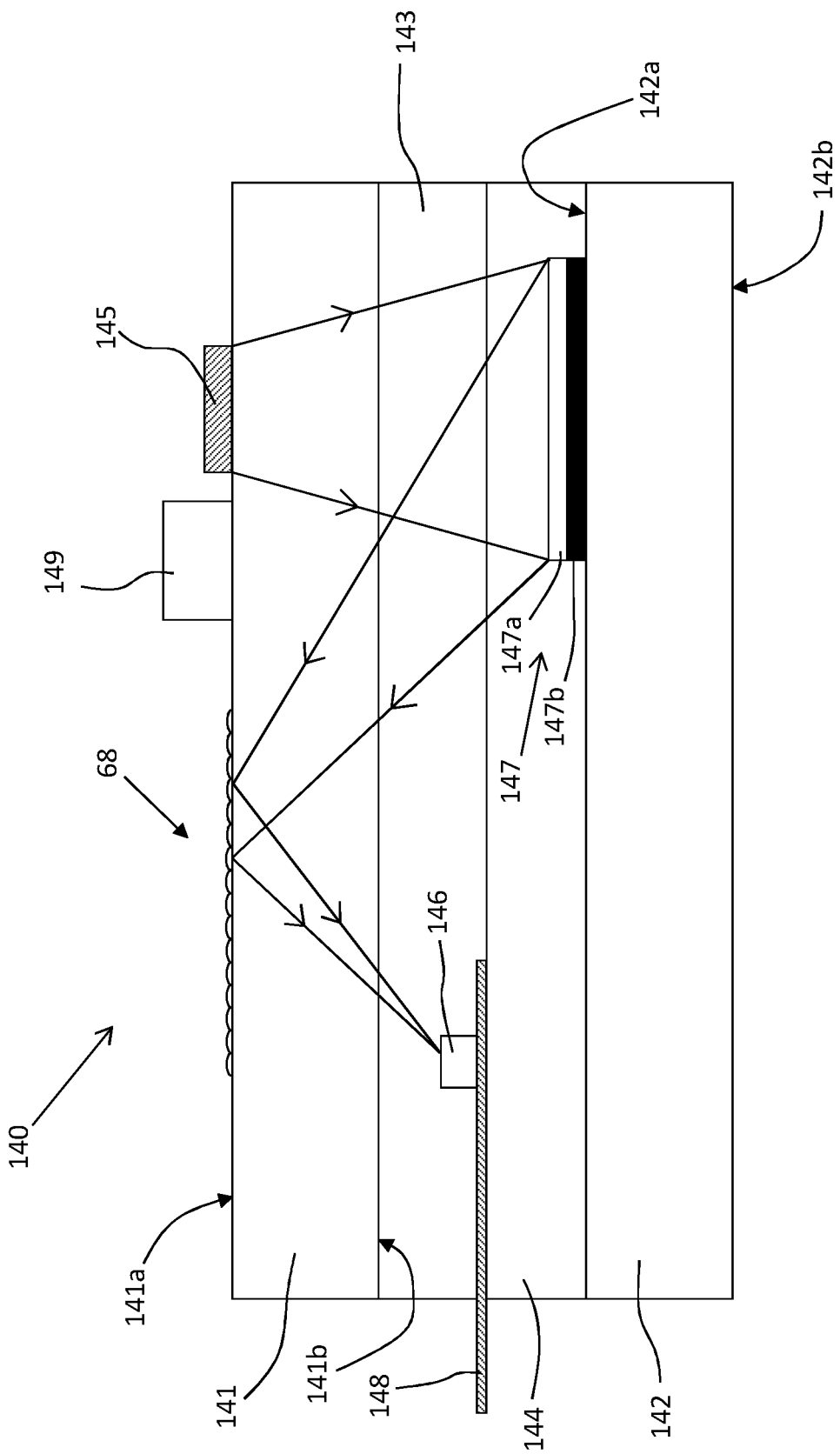
FIG. 17 shows a schematic cross-sectional view of another laminated glazing incorporating a different mist sensor.

FIG. 17 shows another laminated glazing in accordance with the present invention. The laminated glazing 140 has a first glass pane 141 joined to a second glass pane 142 by means of two plies of PVB 143, 144.

The laminated glazing 140 also comprises a mist sensor but in contrast to the previously described laminated glazings, in this example the LED 145 is on an exposed surface of the laminated glazing and not between the two glazing panes (i.e. glass panes 141, 142) of the laminated glazing 140.

The first glass pane 141 has a first major surface 141a and an opposing second major surface 141b. The second glass pane 142 has a first major surface 142a and an opposing second major surface 142b. The laminated glazing 140 is arranged such that the second major surface 141b faces the first major surface 142a.

There is an LED 145 on the first major surface 141a configured to emit light through the first glass pane 141, through the first ply of PVB 143 and through the second ply of PVB 144 onto a target 147 positioned on the first major surface 142a of the second glass pane 142. The target 147 has two coincident layers, a white layer of paint 147a for scattering light by diffuse reflection towards the first major surface 141a and a black layer of opaque paint 147b. The black layer of paint 147b helps reduces the sensitivity of the target 147 to light entering the laminated glazing via the second major surface 142b.

Light illuminates the target 147 from the LED 145 and is diffusely reflected back towards the first major surface 141a. Some of this reflected light strikes a region of the surface 141a on which there is a layer of mist 68. Some of this light is reflected towards the photodiode 147 to produce a signal that may be used to determine the presence of mist on the first major surface 141a i.e. the presence of mist on the region of the first major surface of the first glass pane being illuminated by light reflected from the layer 147a of the target 147.

The photodiode 146 is mounted on a substrate 148 and is electrically connected to electrically conductive pathways on the substrate 148.

In order to reduce the amount of light that may directly reach the photodiode 146 from the LED 145, an optically opaque member 149 is positioned on the first major surface 141a between the LED 145 and the photodiode 147.

The basic operation of the mist sensor in the laminated glazing 140 is essentially the same as that of the mist sensor 1 in the laminated glazing 50, the mist sensor may also be used as a contact/proximity sensor for detecting the presence of an object such as a user's hand contacting or proximal to the first pane of glass 141 in the region illuminated by light reflected from the target 147.

Although in the description of the previous figures reference is made to the use of "light" in the operation of the mist sensor or contact/proximity, for example "a light emitting diode", "a beam of light", and "optically opaque", it is within the scope of the present invention to use electromagnetic radiation in other wavelength regions, for example in the infrared region, such as between 780 nm and 1200 nm i.e. at 800 nm or 880 nm. When such an infrared LED is used for producing a beam having a wavelength in the region 780 nm to 1200 nm, the photodiode is selected to be sensitive to such wavelengths. Furthermore, in order to block such infrared wavelengths from having a direct path to the photodiode, the photodiode may have a body portion that is opaque to such wavelengths. Also, if a two-layer target is used, the upper layer that is illuminated is able to reflect incident infrared radiation in a non-specular manner (such as diffusely) in the range provided by the incident beam, and the lower layer is opaque to radiation that may be detected by the photodiode from stray electromagnetic radiation entering the glazing.

Figure 18:
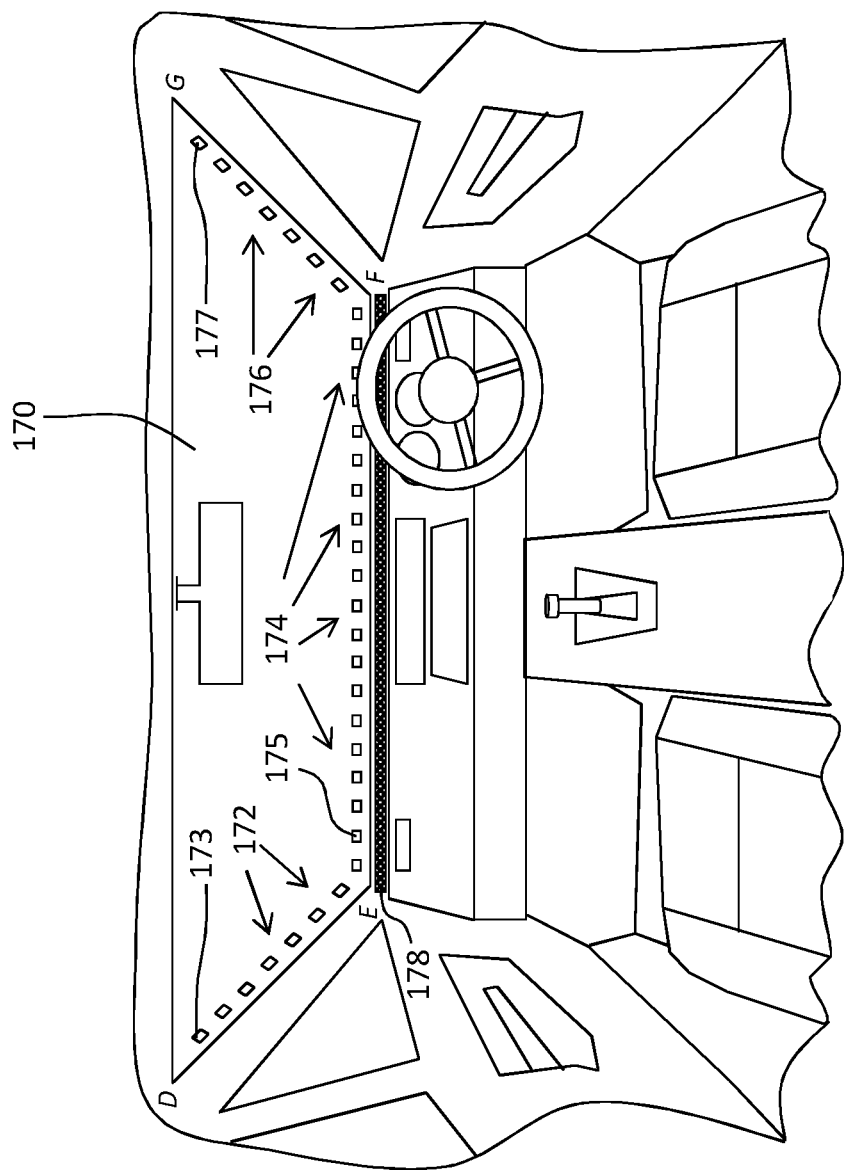
FIG. 18 shows a schematic isometric view of the inside of a vehicle having a laminated windscreen incorporating a plurality of mist sensors.

FIG. 18 shows a schematic isometric view of the inside of a vehicle such as a car. The vehicle has a front windscreen 170 being a laminated glazing comprising an inner and an outer pane of glass joined together by at least one adhesive interlayer ply such as PVB or acoustic modified PVB. In accordance with the present invention, the windscreen 170 comprises a plurality of mist sensors of the type hereinbefore described (for example as shown in FIG. 1) arranged near the peripheral edge of the windscreen.

Along the left-hand edge D-E of the windscreen (i.e. on the passenger side) is a first array of mist sensors 172 comprising seven mist sensors of the type described with reference to FIG. 1 (one of which is labelled as mist sensor 173).

Along the lower edge E-F of the windscreen is a second array of mist sensors 174 comprising twenty mist sensors of the type described with reference to FIG. 1 (one of which is labelled as mist sensor 175).

Along the right-hand edge F-G of the windscreen (i.e. on the driver side) is a third array of mist sensors 176 comprising seven mist sensors of the type described with reference to FIG. 1 (one of which is labelled as mist sensor 177).

Each of the mist sensors in each array 172, 174, 176 may be in communication with a processing means configured such that when mist is detected at the sensing region of the respective mist sensor, a de-misting operation is initiated. For example, proximal to the lower edge E-F of the windscreen 170 is a series of ducts 178 through which warm air may be directed towards the appropriate mist sensor when said sensor detects the presence of mist on the inner facing surface of the windscreen. By suitably actuating fan means to direct warm air when and where required, less energy may be used compared to directing warm air at all regions of the windscreen.

One or more of the mist sensors 173, 175, 177 may be configured as a contact/proximity sensor as previously described, in addition to being configured to detect mist, or instead of being able to detect mist. Furthermore, there may be an additional sensor of the type previously described configured only as a contact/proximity sensor. When configured as a contact/proximity sensor, the contact/proximity sensor may be in communication with an electrically operable device for the actuation thereof such that the contact/proximity sensor functions as a switch.

Figure 19:
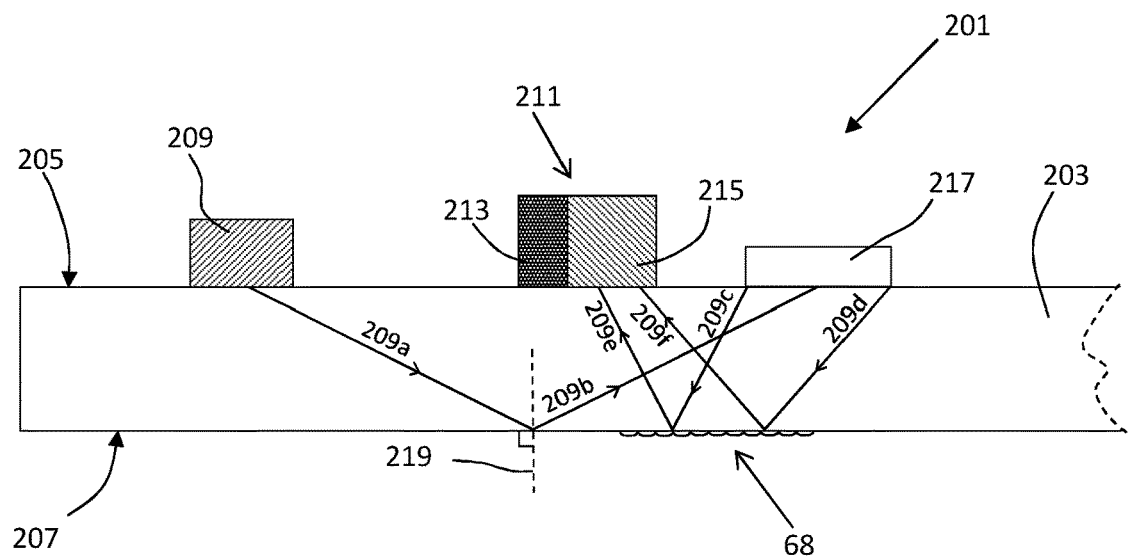
FIG. 19 shows another device for detecting mist on a surface.

FIG. 19 shows a device 201 for detecting mist on a surface. The device may also be used to detect an object contacting or proximal to a surface.

The device 201 comprises a substrate 203 which in this example is a sheet of soda-lime-silica-glass. The soda-lime-silica glass sheet 203 may be thermally toughened or annealed. The thickness of the sheet of soda-lime-silica glass 203 is 4 mm but may be in the range 1 mm to 20 mm, for example 6 mm, or 8 mm, or 10 mm.

In the field of glass in building, thermally toughened soda-lime-silica (sometime referred to as soda-lime-silicate) safety glass is defined in BS EN 12150-1 (2000). Section 3.1 of this standard defines thermally toughened soda lime silica safety glass as "glass within which a permanent surface compressive stress has been induced by a controlled heating and cooling process in order to give it greatly increased resistance to mechanical and thermal stress and prescribed fragmentation characteristics Glass may be semi-toughened or heat strengthened. Such glass for use in building is defined according to BS EN 1863-1 (2000). Heat strengthened glass is not toughened glass as defined in BS EN 12510-1 (2000) but has undergone some form of heat treatment.

Soda lime silica glass for use in building may also be termed "heat soaked thermally toughened soda lime silicate glass" and is defined in accordance with EN 14179-1 (2005).

In section 3.1 of this standard, heat soaked thermally toughened soda lime silicate safety glass is defined as glass within which a permanent surface compressive stress has been induced in order to give it greatly increased resistance to mechanical and thermal stress and prescribed fragmentation characteristics and which has a known level of residual risk of spontaneous breakage due to the presence of critical nickel sulphide (NiS) inclusions.

Laminated glass and laminated safety glass in building is defined in accordance with BS EN ISO 12543-1 (1998). In section 3.8 of this standard, laminated safety glass is defined as laminated glass where in the case of breakage the interlayer serves to retain the glass fragments, limits the size of opening, offers residual resistance and reduces the risk of cutting or piercing injuries.

By clear float glass, it is meant a glass having a composition as defined in BS EN 572 1 and BS EN 572-2 (2012).

The sheet of soda-lime-silica glass has a first major surface 205 and a second opposing major surface 207.

Mounted directly on the first major surface 205 are an infrared emitting LED 209 operable at a wavelength of 800 nm, a photodiode 211 operable to detect infrared radiation at a wavelength of 800 nm and a target 217 that is a diffuse reflector of infrared radiation having a wavelength of 800 nm.

The LED 209 emits a beam of infrared radiation 209a towards the second major surface 207 such that there is total internal reflection of beam 209a when the second major surface is a glass/air interface or a glass/water interface. This is achieved by having an angle of incidence to a normal 219 on the second major surface 207 of around 60°, see equation (1) above.

The beam of infrared radiation 209a is reflected off the glass surface 207 as beam 209b at the same angle of reflection to the normal 219 as the angle of incidence because the glass surface 207 is a specular reflector.

The specularly reflected beam 209b strikes the target 217. The target 217 is a layer of white paint in the form of a rectangle on the first major surface 205. The beam 209b is scattered at multiple angles by the diffusely reflecting surface of the target 217.

The photodiode 211 has a body portion 213 and a sensor portion 215. The body portion 213 is opaque to infrared radiation emitted from the LED 209 so has the effect of shadowing the sensor portion 215 from infrared radiation that has a direct path from the LED 209 to the sensor portion 215.

The sensor portion 215 has an acceptance angle arranged to capture infrared rays reflected from a region of the second major surface 207. The sensor portion 215 essentially "sees" a region of the second major surface 207 that is illuminated by infrared radiation scattered from the target 217. The beams of infrared radiation 209c, 209d reflected from the target 217 are shown illuminating a region of the second major surface 207. On the region of the second major surface is a layer of mist 68. Beams 209e, 209f are reflected off the region of the second major surface 207 and provide a signal measurable by the sensor portion 215 to determine whether or not mist is on the region of the second major surface 207.

As is readily apparent, in this example the device 201 is able to detect mist on the surface 207 of the substrate 203 on which the LED 209, photodiode 211 and target are arranged. The device 201 may be used as a pane in a window, either alone (for example a side window in a vehicle) or in combination with one or more other panes of glazing material and spaced apart therefrom. This is illustrated in FIG. 20.

If the device 201 is used as a pane in a window any or all of the LED 209, the photodiode 211 and the target 217 may be suitably covered with a protective cover or encapsulant.

Figure 20:
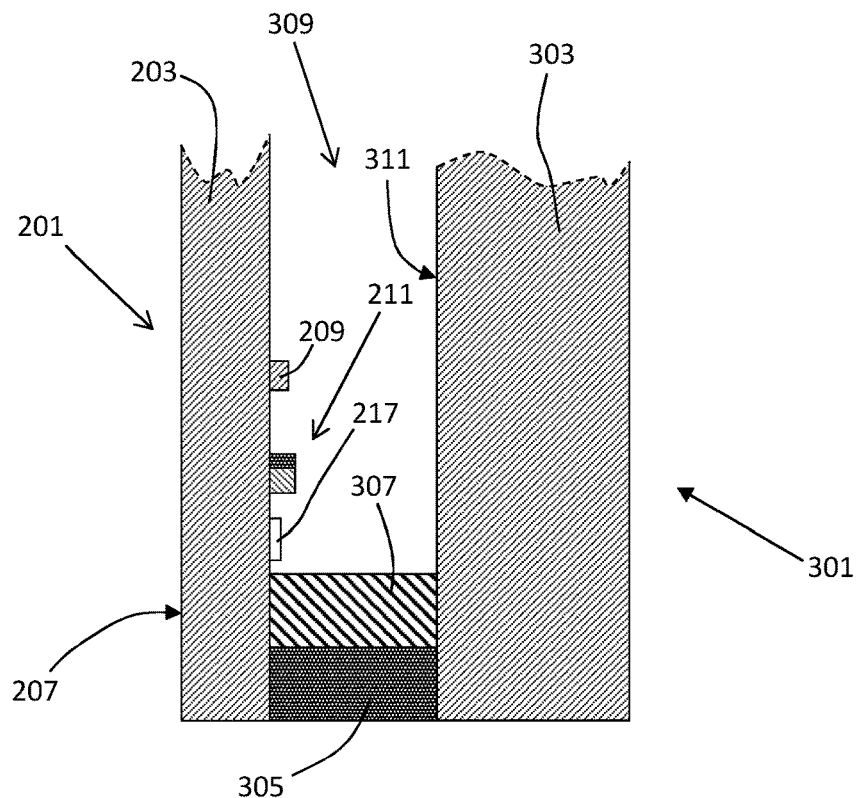
FIG. 20 shows a schematic cross-sectional view of a portion of a double glazing unit comprising the device shown in FIG. 19.

FIG. 20 shows a schematic cross-sectional view of a portion of a double glazing unit 301 comprising the device 201 shown in FIG. 19. As is known in the art, a double glazing unit is often referred to as an insulated glazing unit, or an IGU for short. IGUs are known with two or more glazing panes with an airspace between opposing panes.

The double glazing unit 301 comprises the device 201 spaced apart from glazing pane 303 by a perimeter seal 305 to define an air space 309. A spacer bar 307 may also be provided adjacent to the peripheral seal 305 to help maintain the spacing of the glazing panes 203, 303.

The glazing pane 303 may be glass and may be thermally toughened.

The device 201 may be used to determine the presence of mist on the outer facing surface 207 (as described in relation to FIG. 19) of the double glazing unit 301. Using conventional nomenclature, the outer facing surface 207 may be configured as "surface 1" or "surface 4" of the double glazing unit 301.

The double glazing unit may comprise two devices of the type shown in FIG. 19.

There may be multiple LED/photodiode/target arrangements to detect the presence of mist at different locations on the window, see for example FIG. 18.

When used as a mist sensor, the present invention finds particular application in the automotive field where mist may form on an inner facing surface of a vehicle glazing such as a windscreen When used as a contact/proximity sensor, the present application may also be used when a switch is required in a laminated glazing of the type found in the automotive field.

The present invention allows mist to be detected at an early stage thereby allowing suitable preventative measures to be enabled to help prevent further formation thereof. The present invention also provides a switch that may also function as a mist sensor thereby reducing the number of sensors that may be required to achieve a desired functionality.

The invention claimed is:

1. A laminated glazing comprising:
    a first pane of glazing material joined to a second pane of glazing material by an interlayer structure comprising at least one ply of adhesive interlayer material, each of the first and second panes of glazing material having respectively a first major surface and a second opposing major surface, the laminated glazing being configured such that the second major surface of the first pane of glazing material faces the first major surface of the second pane of glazing material;
    wherein the laminated glazing comprises at least one device, the at least one device comprising transmitter means for emitting at least one (a first) beam of electromagnetic radiation, detector means for detecting electromagnetic radiation and a target having a reflective surface for the first beam of electromagnetic radiation, the reflective surface of the target being a non-specular reflective surface;
    wherein the transmitter means is configured to emit the first beam of electromagnetic radiation to illuminate the target such that electromagnetic radiation reflected from the reflective surface of the illuminated target follows at least one path towards the first major surface of the first pane of glazing material to illuminate a region thereof;

wherein at least a portion of the electromagnetic radiation reflected off the region of the first major surface of the first pane of glazing material is detectable by the detector means to provide a detection signal; and further wherein the transmitter means, the detector means and the target are between the first and second panes of glazing material.

2. The laminated glazing according to claim 1, wherein the first beam of electromagnetic radiation emitted from the transmitter means is reflected off the first major surface of the first pane of glazing material to illuminate the target.

3. The laminated glazing according to claim 1, wherein there is at least one electrically conductive pathway on the second major surface of the first pane of glazing material and at least one of the transmitter means and the detector means is in electrical communication with the at least one electrically conductive pathway on the second major surface of the first pane of glazing material; and/or wherein there is at least one electrically conductive pathway on the first major surface of the second pane of glazing material and at least one of the transmitter means and the detector means is in electrical communication with the at least one electrically conductive pathway on the first major surface of the second pane of glazing material.

4. The laminated glazing according to claim 1, wherein there is at least one electrically conductive pathway on the second major surface of the first pane of glazing material and at least one electrically conductive pathway on the first major surface of the second pane of glazing material, further wherein one of the transmitter means and the detector means in in electrical communication with the at least one electrically conductive pathway on the first major surface of the second pane of glazing material, the other of the transmitter means and the detector means being in electrical communication with the at least one electrically conductive pathway on the second major surface of the first pane of glazing material.

5. The laminated glazing according to claim 1, wherein the target is on the second major surface of the first pane of glazing material, the first major surface of the second pane of glazing material or the at least one ply of adhesive interlayer material.

6. The laminated glazing according to claim 1, wherein the transmitter means is arranged to emit the first beam of electromagnetic radiation at an angle of incidence to a normal on the first major surface of the first pane of glazing material, wherein the angle of incidence is at least $\sin^{-1}(n_2/n_1)$, where $n_1$ is the refractive index of the first pane of glazing material at a wavelength of 540 nm and $n_2$ is the refractive index of air or water at 540 nm; or wherein the transmitter means is arranged to emit the first beam of electromagnetic radiation at an angle of incidence to a normal on the first major surface of the first pane of glazing material of greater than 40°; or wherein the transmitter means is arranged to emit the first beam of electromagnetic radiation at an angle of incidence to a normal on the first major surface of the first pane of glazing material of between 40° and 80°.

7. The laminated glazing according to claim 1, wherein the transmitter means is spaced apart from the first major surface of the first pane of glazing material by a minimum distance h, and the spacing of the transmitter means and an edge of the target is at least $2 \times h \times \tan(\theta)$ where $\theta$ is the angle of incidence of the first beam of electromagnetic radiation to a normal on the first major surface of the first pane of glazing material.

8. The laminated glazing according to claim 1, wherein the target comprises a first layer for reflecting electromagnetic incident thereon and a second layer for preventing electromagnetic radiation reaching the first layer from the direction of the second major surface of the second pane of glazing material.

9. The laminated glazing according to claim 1, wherein the reflective surface of the target comprises at least one of (i) a reflecting surface that provides diffuse reflection and (ii) a retroreflector.

10. The laminated glazing according to claim 1, wherein at least one of the transmitter means and the detector means is on a first substrate, the first substrate having a first major surface and a second opposing major surface, further wherein the first major surface of the first substrate faces the second major surface of the first pane of glazing material and the second major surface of the first substrate faces the first major surface of the second pane of glazing material.

11. The laminated glazing according to claim 10, wherein at least one of the transmitter means and the detector means is on the first major surface of the first substrate or the second major surface of the first substrate; or wherein the transmitter means is on the second major surface of the first substrate, and wherein the first substrate has an opening therein, the opening being coincident with the transmitter means such that the first beam of electromagnetic radiation can pass through the opening; and/or wherein the target is on the second major surface of the first pane of glazing material, the first major surface of the second pane of glazing material or the at least one ply of adhesive interlayer material.

12. The laminated glazing according to claim 10, wherein the transmitter means, the detector means and the target are on the first substrate.

13. The laminated glazing according to claim 10, wherein the first and/or second major surface of the first substrate has one or more electrically conductive pathways thereon and at least one of the electrically conductive pathways on the first or second major surface of the first substrate is in electrical communication with one of the transmitter means or the detector means.

14. The laminated glazing according to claim 10, wherein the first substrate is transparent to the first beam of electromagnetic radiation and/or wherein the first substrate comprises a polyester.

15. A detection method comprising the steps:
(i) directing a beam of electromagnetic radiation from a transmitter means onto a target having a reflective surface that is not a specular reflector to illuminate the target;
(ii) illuminating a region of a surface of a window with electromagnetic radiation reflected from the reflective surface of the illuminated target;
(iii) capturing electromagnetic radiation reflected off the region of the surface of the window with detector means to provide a detection signal; and
(iv) using the detection signal to determine the presence of mist on the surface of the window and/or the presence of an object contacting or proximal at least a portion of the surface of the window;

wherein the window comprises a first pane of glazing material spaced apart from a second pane of glazing material, and wherein the transmitter means, the detector means and the target are between the first and second panes of glazing material.

16. A detection method according to claim 15, wherein the window is a laminated glazing installed in a vehicle, the laminated glazing having a surface facing an interior of the vehicle and an opposing outer surface, further wherein the surface of the window is the inner surface of the laminated glazing.

* * * * *